(12) United States Patent
Kim et al.

(10) Patent No.: US 12,518,502 B2
(45) Date of Patent: Jan. 6, 2026

(54) IMAGE CONTENT TRANSMITTING METHOD AND DEVICE USING EDGE COMPUTING SERVICE

(71) Applicant: SAMSUNG ELECTRONICS CO., LTD., Suwon-si (KR)

(72) Inventors: Eunji Kim, Suwon-si (KR); Koanmo Kim, Suwon-si (KR); Jiwon Kim, Suwon-si (KR); Boyoung Lee, Suwon-si (KR); Jaehong Lee, Suwon-si (KR); Joonseop Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 480 days.

(21) Appl. No.: 17/990,319

(22) Filed: Nov. 18, 2022

(65) Prior Publication Data

US 2023/0079171 A1 Mar. 16, 2023

Related U.S. Application Data

(63) Continuation of application No. PCT/KR2021/006214, filed on May 18, 2021.
(Continued)

(30) Foreign Application Priority Data

Sep. 21, 2020 (KR) .................. 10-2020-0121793

(51) Int. Cl.
*G06V 10/24* (2022.01)
*G06T 9/00* (2006.01)
*G06T 19/00* (2011.01)

(52) U.S. Cl.
CPC ............. *G06V 10/24* (2022.01); *G06T 9/00* (2013.01); *G06T 19/006* (2013.01)

(58) Field of Classification Search
CPC ......... G06V 10/24; G06T 9/00; G06T 19/006; G06F 3/011; G06F 3/012; G06F 3/013;
(Continued)

(56) References Cited

U.S. PATENT DOCUMENTS 8,330,793 B2 12/2012 Robinson et al.
8,606,952 B2 12/2013 Pasetto et al.
(Continued)

FOREIGN PATENT DOCUMENTS

CN 105392538 A 3/2016
CN 107548557 A 1/2018
(Continued)

OTHER PUBLICATIONS

International Search Report (PCT/ISA/220 and PCT/ISA/210) and Written Opinion (PCT/ISA/237)issued Aug. 18, 2021 by the International Searching Authority in International Application No. PCT/KR2021/006214.
(Continued)

*Primary Examiner* — Mia M Thomas
(74) *Attorney, Agent, or Firm* — Sughrue Mion, PLLC

(57) ABSTRACT

The present disclosure relates to a server, an electronic device and their methods of transmitting or receiving image content. In one embodiment, a method performed by the server includes obtaining sensor information including orientation information detected by the electronic device connected to the server; obtaining state information regarding the server and the electronic device; identifying a size of a first partial image and a position of the first partial image, based on the sensor information and the state information; generating a first frame by encoding the first partial image, based on the identified size of the first partial image or identified position of the first partial image; and transmitting the generated first frame to the electronic device.

20 Claims, 24 Drawing Sheets

Related U.S. Application Data

(60) Provisional application No. 63/026,312, filed on May 18, 2020.

(58) Field of Classification Search
CPC .... G06F 3/016; H04N 19/597; H04N 21/816; H04N 21/2343; H04N 21/24; H04N 21/2662
See application file for complete search history.

(56) References Cited

U.S. PATENT DOCUMENTS

| | | | |
|---|---|---|---|
| 9,912,717 | B2 | 3/2018 | Ha et al. |
| 10,504,442 | B2 | 12/2019 | Yoo |
| 10,594,924 | B2 * | 3/2020 | Kang ................... G06F 3/04815 |
| 10,880,346 | B2 | 12/2020 | Adams et al. |
| 11,050,810 | B2 | 6/2021 | Park et al. |
| 11,228,754 | B2 * | 1/2022 | Raveendran ........... H04N 19/70 |
| 12,056,286 | B2 * | 8/2024 | Kim ................... G06F 3/04845 |
| 12,056,327 | B1 * | 8/2024 | Ansari ................. H04N 23/698 |
| 2014/0189091 | A1 | 7/2014 | Tamasi et al. |
| 2017/0244775 | A1 | 8/2017 | Ha et al. |
| 2018/0077409 | A1 | 3/2018 | Heo et al. |
| 2018/0109724 | A1 * | 4/2018 | Kang ............. H04N 21/47205 |
| 2018/0192001 | A1 | 7/2018 | Boyce |
| 2018/0203660 | A1 * | 7/2018 | Hwang ................. G06F 3/1423 |
| 2019/0007681 | A1 * | 1/2019 | Tsai ...................... H04N 19/18 |
| 2019/0037138 | A1 * | 1/2019 | Choe ................... H04N 23/698 |
| 2019/0320184 | A1 * | 10/2019 | Zhu ...................... H04N 19/166 |
| 2019/0373042 | A1 | 12/2019 | Park et al. |
| 2020/0007905 | A1 * | 1/2020 | Han ................... H04L 41/0803 |
| 2020/0045288 | A1 | 2/2020 | Boyce |
| 2020/0077124 | A1 | 3/2020 | Shi et al. |
| 2020/0319835 | A1 * | 10/2020 | Bae ....................... G06F 3/1423 |
| 2020/0322663 | A1 * | 10/2020 | Vaderna ............... H04L 47/263 |
| 2021/0014472 | A1 | 1/2021 | He et al. |
| 2021/0110610 | A1 * | 4/2021 | Xu ........................ G06V 20/20 |
| 2021/0117146 | A1 * | 4/2021 | Choi ................. H04N 21/43076 |
| 2021/0129019 | A1 * | 5/2021 | Colenbrander ....... H04L 65/765 |
| 2021/0256658 | A1 * | 8/2021 | Kim ..................... G06T 3/4046 |
| 2022/0197380 | A1 | 6/2022 | Tokubo et al. |
| 2022/0312057 | A1 * | 9/2022 | Lee ....................... H04N 13/189 |
| 2022/0343488 | A1 * | 10/2022 | Kim ...................... G06N 20/00 |
| 2023/0076650 | A1 * | 3/2023 | Kim ....................... A63F 13/352 |
| 2023/0260191 | A1 * | 8/2023 | Mihály ................... G06T 7/20 345/419 |
| 2023/0308625 | A1 * | 9/2023 | Abhishek ............... H04L 65/70 |
| 2024/0212179 | A1 * | 6/2024 | Valli .................... H04N 19/597 |
| 2024/0430480 | A1 * | 12/2024 | Lee ..................... H04N 19/597 |

FOREIGN PATENT DOCUMENTS

| | | | | |
|---|---|---|---|---|
| KR | 10-2018-0052255 | A | 5/2018 | |
| KR | 10-2019-0021229 | A | 3/2019 | |
| KR | 10-1965746 | B1 | 4/2019 | |
| KR | 10-2019-0074267 | A | 6/2019 | |
| KR | 10-2013403 | B1 | 8/2019 | |
| KR | 10-2019-0106306 | A | 9/2019 | |
| KR | 10-2046713 | B1 | 11/2019 | |
| KR | 10-2135331 | B1 | 7/2020 | |
| WO | WO-2018186646 | A1 * | 10/2018 | ........... H04N 21/816 |
| WO | WO-2019199379 | A1 * | 10/2019 | ........... G06F 1/1694 |
| WO | 2020/079320 | A1 | 4/2020 | |
| WO | WO-2020189895 | A1 * | 9/2020 | ............. H04N 19/20 |
| WO | WO-2022035194 | A1 * | 2/2022 | ................ G06F 3/14 |

OTHER PUBLICATIONS

Communication dated Aug. 21, 2024, issued by the China National Intellectual Property Administration in counterpart Chinese Application No. 202180036437.9.
Communication dated Aug. 30, 2023, issued by the European Patent Office in counterpart European Application No. 21808088.5.
Koch et al., "Increasing the Quality of 360° Video Streaming by Transitioning between Viewport Quality Adaptation Mechanisms," arXiv:1910.02397v1 [cs.NI], Oct. 2019, Total 13 pages.
Office Action issued Jan. 9, 2025 by the Korean Patent Office for KR Patent Application No. 10-2020-0121793.
Office Action issued on Feb. 21, 2025 by the Chinese Patent Office in corresponding CN Patent Application No. 202180036437.9.
Communication issued Feb. 11, 2025 by the European Patent Office for EP Patent Application No. 21808088.5.

* cited by examiner

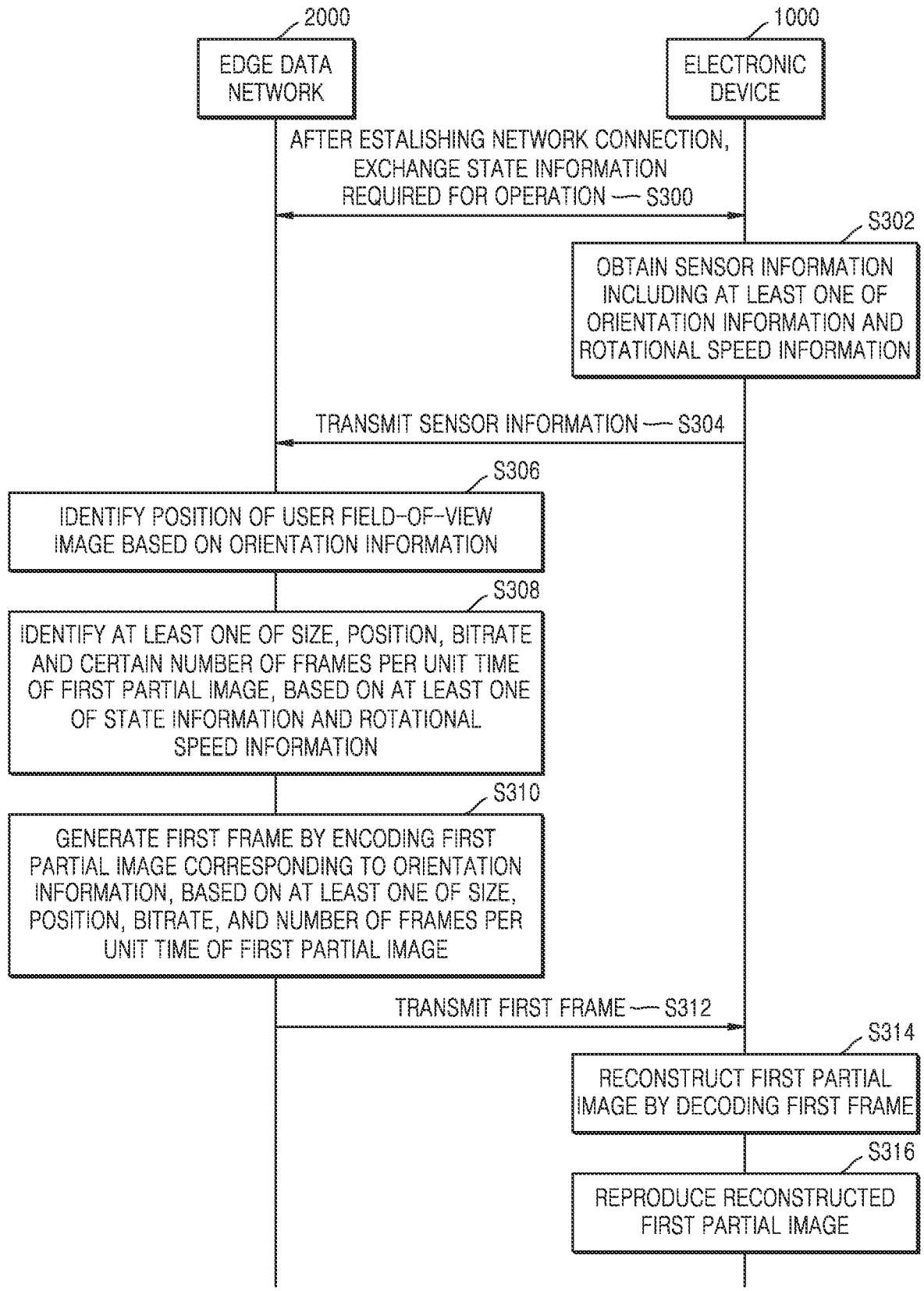

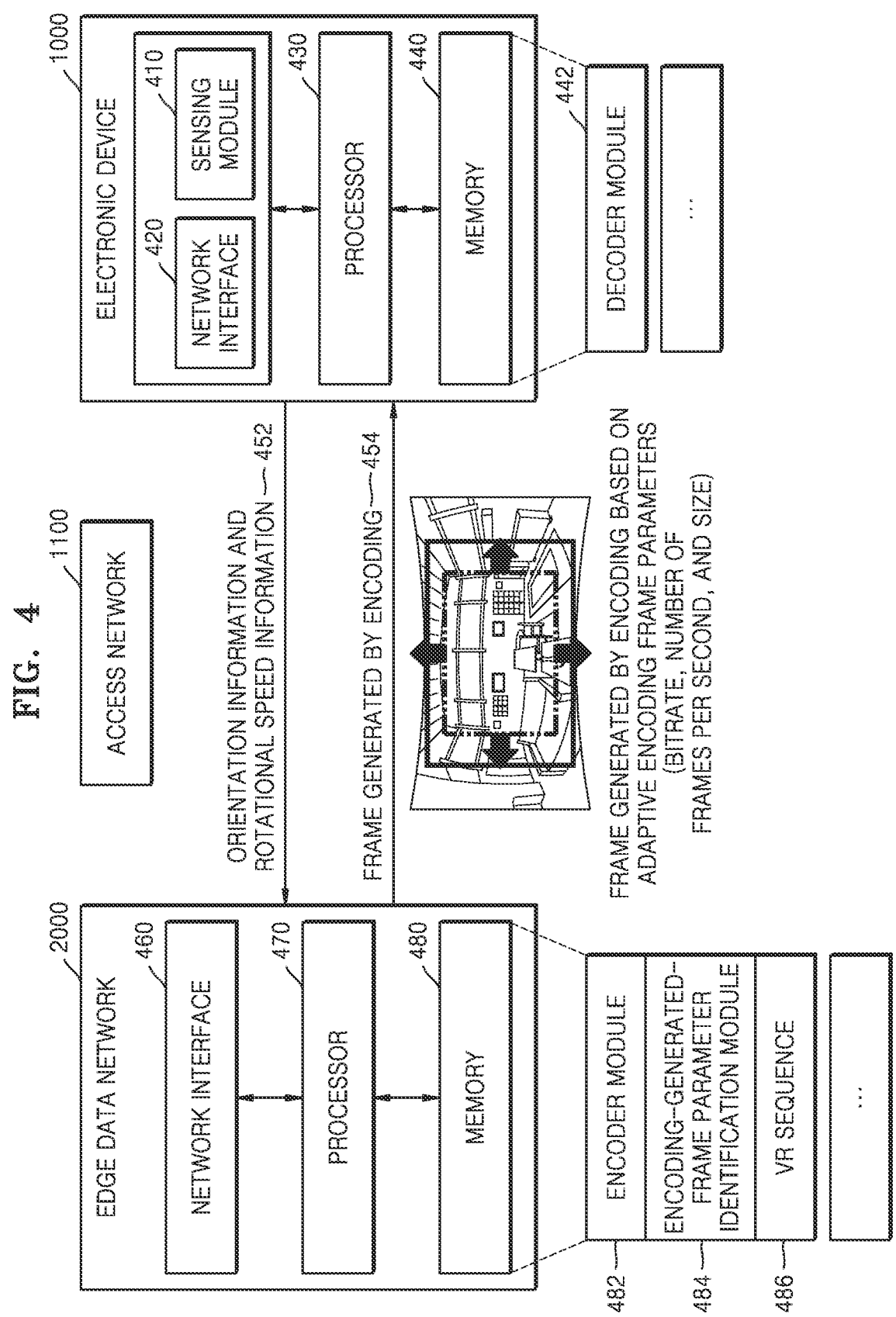

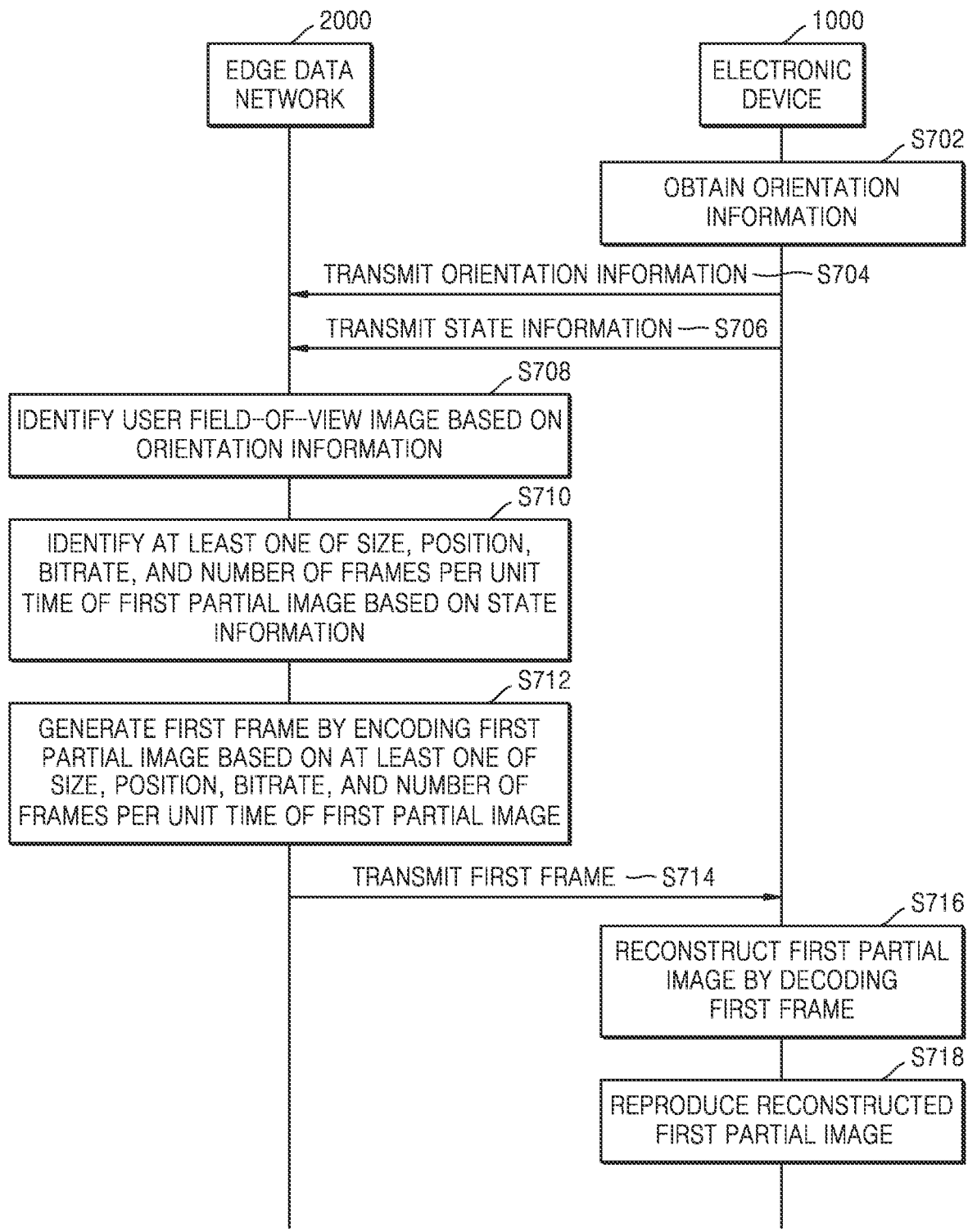

FIG. 8D
IN CASE IN WHICH
STATE PARAMETER IS
GREATER THAN
FIRST THRESHOLD
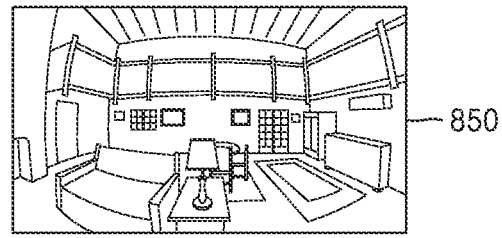
— 850
width: 2500, height: 1400
Bitrate: 25 Mbps; FPS: 60fps
IN CASE IN WHICH
STATE PARAMETER IS
LESS THAN OR EQUAL TO
FIRST THRESHOLD
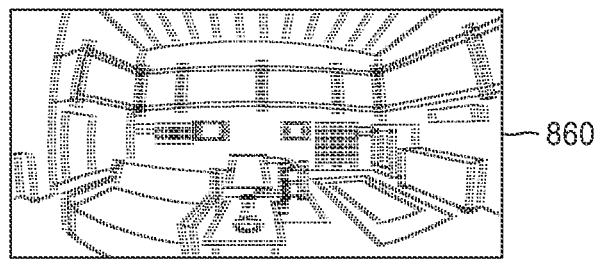
— 860
width: 2600, height: 1500
Bitrate: 15 Mbps; FPS: 30fps

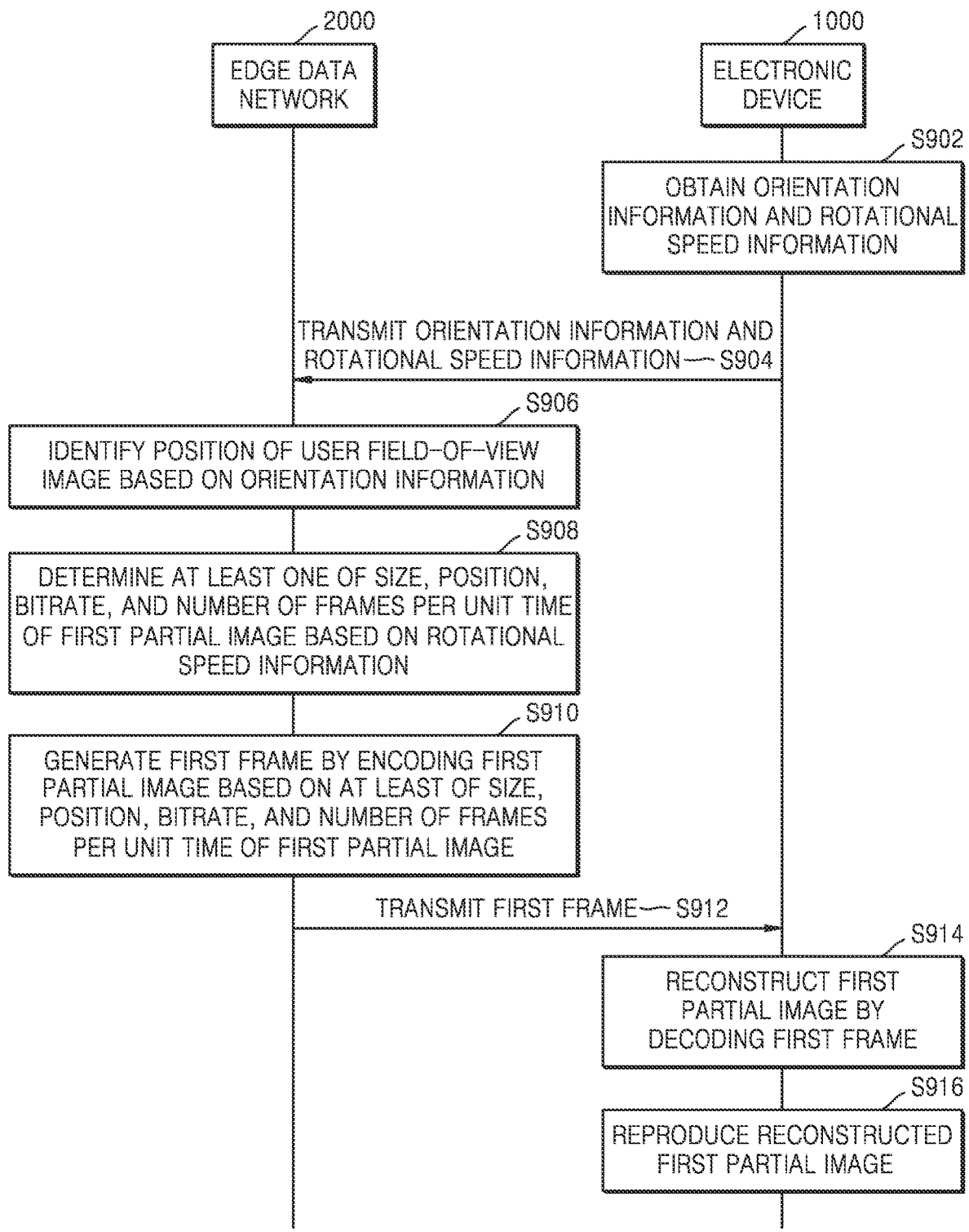

IMAGE CONTENT TRANSMITTING METHOD AND DEVICE USING EDGE COMPUTING SERVICE

CROSS-REFERENCE TO RELATED APPLICATIONS

This application is a by-pass continuation application of International Application No. PCT/KR2021/006214, filed on May 18, 2021, which based on and claims priority to U.S. Provisional Patent Application No. 63/026,312, filed on May 18, 2020, in the Unites States Patent and Trademark Office, and Korean Patent Application No. 10-2020-0121793, filed on Sep. 21, 2020, in the Korean Intellectual Property Office, the disclosures of which are incorporated by reference herein in their entireties.

BACKGROUND

1. Field

The present disclosure relates to an image content transmitting method and device using an edge computing service (e.g., a Multi-access Edge Computing (MEC) service).

2. Description of Related Art

Recently, edge computing technology for transmitting data using an edge server has been discussed. The edge computing technology may include, for example, MEC or fog computing (FOC). Edge computing technology provides data to an electronic device via a separate server (hereinafter referred to as an 'edge data network,' an 'edge data network server,' or a 'MEC server') provided at a location geographically close to the electronic device, for example, inside or around a base station. For example, an application requiring low latency among at least one application installed in an electronic device may transmit and receive data via an edge server provided at a geographically close location, without passing through a server located in an external data network (DN) (e.g., the Internet).

Recently, a service using edge computing technology (hereinafter referred to as 'MEC-based service' or 'MEC service') has been discussed, and research and development of electronic devices to support MEC-based services have been conducted. For example, an application of an electronic device may transmit and receive edge computing-based data to and from an edge server (or an application of the edge server) in an application layer.

As research and development to support MEC-based services progress, techniques for providing high-resolution image content to an electronic device by using MEC are discussed. Based on the discussions above, the present disclosure relates to an image content transmitting method and device using an edge computing service.

More particularly, the present disclosure provides a method, performed by an edge data network, of transmitting image content to an electronic device, and an edge data network for providing image content to an electronic device.

In addition, the present disclosure provides a method, performed by an electronic device, of receiving image content from an edge data network, and an electronic device for receiving image content from an edge data network.

SUMMARY

According to an aspect of an embodiment, a method, performed by a server (e.g., an edge computing network) of transmitting image content to an electronic device, includes: obtaining sensor information including orientation information detected by the electronic device connected to the server; obtaining state information regarding the server and the electronic device; identifying a size of a first partial image and a position of the first partial image, based on the sensor information and the state information; generating a first frame by encoding the first partial image, based on the identified size of the first partial image or identified position of the first partial image; and transmitting the generated first frame to the electronic device.

According to another aspect of an embodiment, a server for transmitting image content to an electronic device, includes: a network interface; a memory storing one or more instructions; and a processor configured to execute the one or more instructions to: obtain sensor information including orientation information detected by an electronic device connected to the server, obtain state information regarding the server and the electronic device, identify a size of a first partial image and a position of the first partial image, based on the sensor information and the state information, generate a first frame by encoding the first partial image based on the identified size of the first partial image or the identified position of the first partial image, and transmit the generated first frame to the electronic device.

According to another aspect of an embodiment, a computer-readable recording medium having recorded thereon a program for executing, on a computer, a method performed by a server and includes: obtaining sensor information including orientation information detected by an electronic device connected to the server; obtaining state information regarding the server and the electronic device; identifying a size of a first partial image and a position of the first partial image, based on the sensor information and the state information; generating a first frame by encoding the first partial image based on the identified size of the first partial image or the identified position of the first partial image; and transmitting the generated first frame to the electronic device.

According to another aspect of an embodiment, a method, performed by an electronic device, of streaming image content obtained from a server, includes: transmitting, to the server, orientation information and rotational speed information, a state parameter, and connected device state information; obtaining, from the server, a first frame generated by encoding a first partial image according to at least one of a size of the partial image, a position of the partial image, a bitrate of the partial image, and a number of frames per unit time of the first partial image, which are identified based on at least one of the orientation information, the rotational speed information, the state parameter, or the connected device information; reconstructing the first partial image by decoding the first frame; and reproducing the reconstructed first partial image based on orientation information at a time point of the reconstructing.

For example, the orientation information is an angle value of a gaze of a user using the electronic device. For example, the rotational speed information is information on a rotational speed of the user using the electronic device. For example, the state parameter is one or more of (i) an amount of data per unit time processed by the electronic device, (ii) a total sum of data received per unit time by the electronic device, (iii) a number of packets received per unit time by the electronic device. For example, the connected device information indicates a size of a viewport area of the electronic device.

Embodiments of the present disclosure provide a method of effectively performing an operation between an edge data network and an electronic device, based on image content.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a flowchart illustrating an operation procedure between an electronic device and an edge data network, according to an embodiment of the present disclosure;

FIG. 4 is a diagram schematically illustrating an operation procedure between an electronic device and an edge data network;

FIG. 7 is a flowchart illustrating an operation procedure between an electronic device and an edge data network, according to an embodiment of the present disclosure;

FIG. 8D is a diagram illustrating parameters of an encoding-generated frame being streamed, in a case in which a state parameter is greater than, less than or equal to a first threshold, according to an embodiment FIG. 9 is a flowchart illustrating an operation procedure between an electronic device and an edge data network, according to an embodiment of the present disclosure;

DETAILED DESCRIPTION

Figure 1:
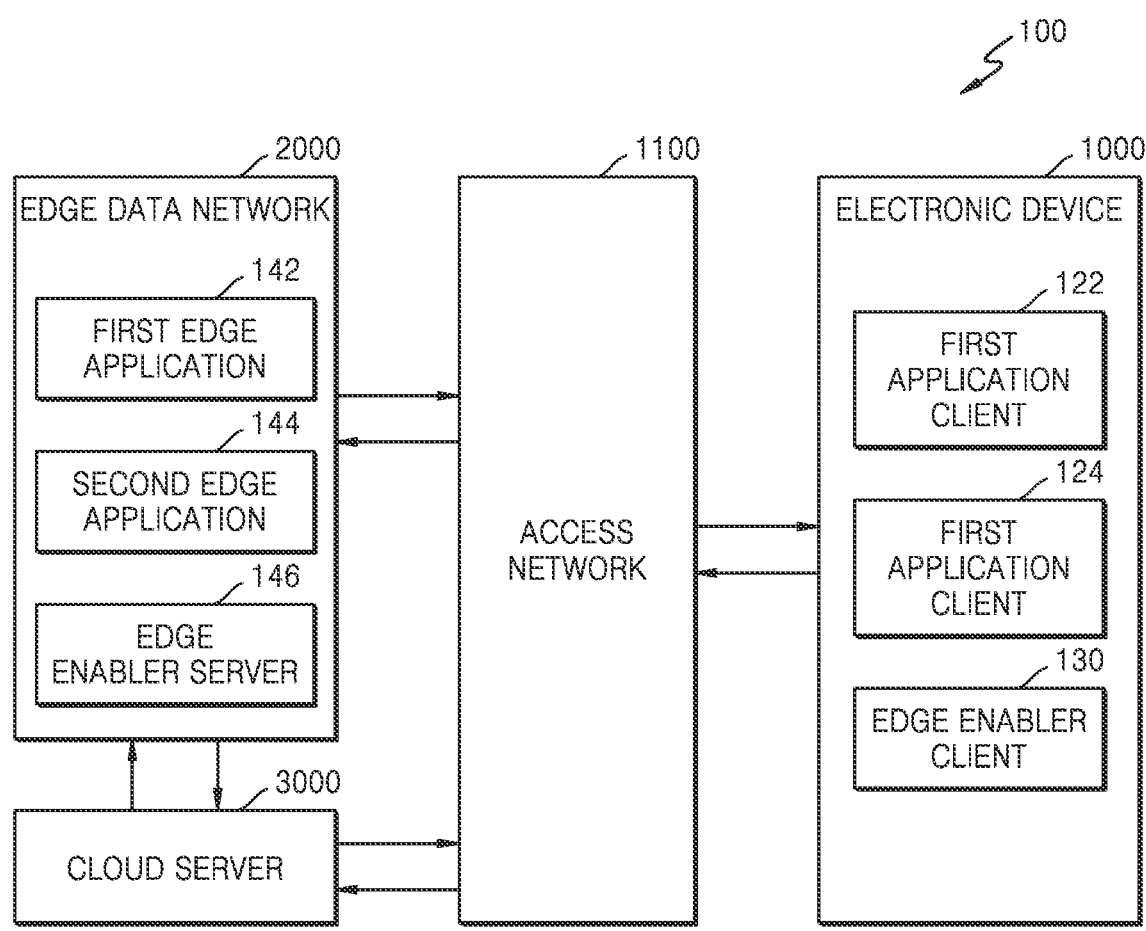
FIG. 1 is a diagram schematically illustrating Multi-access Edge Computing (MEC) technology in a network environment, according to an embodiment of the present disclosure.

Hereinafter, embodiments of the present disclosure are described in detail with reference to the accompanying drawings. In the description of embodiments, technical features that are well known to the technical field to which the present disclosure belongs but are not directly associated with the present disclosure are not described. This is not to obscure but to clearly deliver the gist of the present disclosure by omitting an unnecessary description.

For the same reason, in the accompanying drawings, some elements are exaggerated, omitted, or schematically shown. In addition, sizes of elements do not fully reflect actual sizes thereof. In the drawings, identical or corresponding elements are provided with identical reference numerals.

Advantages and features of the present disclosure and a method for achieving them will be apparent with reference to embodiments described below together with the attached drawings. The present disclosure may, however, be embodied in many different forms and should not be construed as being limited to the embodiments set forth herein, rather, these embodiments are provided such that the present disclosure will be thorough and complete, and will fully convey the concept of the present disclosure to those of ordinary skill in the art, and the present disclosure will be defined only by the concept of the claims. Like reference numerals denote like elements throughout the specification.

Here, it may be understood that each block in processing flowchart drawings and combinations of flowchart drawings may be performed by computer program instructions. These computer program instructions may be loaded in a processor of a general-purpose computer, a particular-purpose computer, or other programmable data processing equipment, and thus, the instructions performed by a processor of a computer or other programmable data processing equipment may generate a means configured to perform functions described in flowchart block(s). These computer program instructions may also be stored in a computer-usable or computer-readable memory capable of orienting a computer or other programmable data processing equipment to implement a function in a particular mode, and thus, the instructions stored in the computer-usable or computer-readable memory may also produce a production item involving an instruction means configured to perform a function described in flowchart block(s). The computer program instructions may also be loaded in a computer or other programmable data processing equipment, and thus, a computer-executable process may also be generated by performing a series of operation steps on the computer or the other programmable data processing equipment so that the instructions executed in the computer or the other programmable data processing equipment provide steps for executing functions described in flowchart block(s).

In addition, each block may indicate a portion of a module, a segment, or a code including one or more executable instructions for executing particular logical function(s). Also, in several substitutional embodiments, functions described in blocks may also be out of a sequence. For example, two consecutively shown blocks may be substantially performed at the same time in fact, or the blocks may be sometimes performed in a reverse order according to a corresponding function.

The term ' . . . unit' used in the embodiments denotes a component including software or hardware, such as a field programmable gate array (FPGA) or an application-specific integrated circuit (ASIC), and the ' . . . unit' performs certain roles. However, the ' . . . unit' does not always have a meaning limited to software or hardware. The ' . . . unit' may be configured either to be stored in an addressable storage medium or to execute one or more processors. Therefore, for example, the ' . . . unit' includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and ' . . . units' may be combined into a smaller number of components and ' . . . units' or be further divided into additional components and ' . . . units'. In addition, components and ' . . . units' may be implemented to reproduce one or more central processing units (CPUs) inside a device or a security multimedia card. Also, in an embodiment, the ' . . . unit' may include one or more processors. Further, data units may indicate subsets of particular data formats, such as image data. For example, data units of image data are subsets or partial portions of the image data.

FIG. 1 is a diagram schematically illustrating Multi-access Edge Computing (MEC) technology in a network environment, according to an embodiment of the present disclosure.

Referring to FIG. 1, a network environment 100 of the present disclosure may include an electronic device 1000, an edge data network 2000, a cloud server 3000, and an access network (AN) 1100. However, components included in the network environment 100 are not limited thereto.

According to an embodiment, each of the components included in the network environment 100 may be a physical entity unit or a software or module unit configured to perform an individual function.

According to an embodiment, the electronic device 1000 may refer to a device used by a user. For example, the electronic device 1000 may refer to a terminal, a user equipment (UE), a mobile station, a subscriber station, a remote terminal, a wireless terminal, or a user device.

In addition, the electronic device 1000 may be a terminal for providing content to allow a user to be immersed in a virtual environment including at least one of virtual reality (VR), augmented reality (AR), or mixed reality (MR). That is, according to an embodiment, the electronic device 1000 may be a head-mounted display (HMD) or a virtual reality headset (VRH) for providing content for VR, AR, or MR.

Referring to FIG. 1, the electronic device 1000 may include a first application client (or an application client) 122, a second application client 124, and an edge enabler client (or an MEC enabling layer (MEL)) 130. The electronic device 1000 may perform, by using the edge enabler client 130, a necessary operation to use an MEC service. The edge enabler client 130 is described below in detail.

According to an embodiment, the electronic device 1000 may execute a plurality of applications. For example, the electronic device 1000 may execute the first application client 122 and the second application client 124. The plurality of applications may require different network services based on at least one of a required data transmission rate, a latency (or a speed), reliability, the number of electronic devices having accessed a network, a network access period of the electronic device 1000, or an average data use amount. The different network services may include, for example, enhanced mobile broadband (eMBB), ultra-reliable and low latency communication (URLLC), or massive machine type communication (mMTC).

An application client of the electronic device 1000 may refer to a default application previously installed in the electronic device 1000 or an application provided by a third party. That is, an application client of the electronic device 1000 may refer to a client application program running in the electronic device 1000 for a particular application service. Several application clients may run on the electronic device 1000. At least one of the application clients may use a service provided by the edge data network 2000. For example, an application client may be an application installed in and executed by the electronic device 1000, and may provide a function of transmitting and receiving data via the edge data network 2000. An application client in the electronic device 1000 may refer to application software executed in the electronic device 1000 to use a function provided by one or more particular edge applications.

According to an embodiment, the plurality of applications, i.e., the first application client 122 and the second application client 124, in the electronic device 1000 may perform data transmission and reception with the cloud server 3000 based on a required network service type or perform data transmission and reception with the edge data network 2000 based on edge computing. For example, in a case in which the first application client 122 does not require a low latency, the first application client 122 may perform data transmission and reception with the cloud server 3000. As another example, in a case in which the second application client 124 requires a low latency, the second application client 124 may perform MEC-based data transmission and reception with the edge data network 2000.

According to an embodiment, an application in the electronic device 1000 may be referred to as an application client, a client application (or a client app), or a UE application (or a UE app). For convenience, hereinafter, in the present disclosure, an application in the electronic device 1000 is referred to as an application client.

According to an embodiment, the AN 1100 may provide a channel for wireless communication with the electronic device 1000. For example, the AN 1100 may refer to a radio access network (RAN), a base station, an evolved node B (eNodeB or eNB), a 5th generation (5G) node, a transmission/reception point (TRP), or a 5G NodeB (5GNB).

According to an embodiment, the edge data network 2000 may refer to a 'server' that the electronic device 1000 accesses to use an MEC service. The edge data network 2000 may be provided at a location geographically close to the electronic device 1000, e.g., inside or around a base station. According to an embodiment, the edge data network 2000 may transmit and receive data to and from the electronic device 1000 without passing through an external data network (DN) (e.g., the Internet). In an embodiment, MEC may be referred to as multi-access edge computing or mobile-edge computing.

According to an embodiment, the edge data network 2000 may be referred to as an MEC host, an edge computing server, a mobile edge host, an edge computing platform, an MEC server, or the like. For convenience, hereinafter, in the present disclosure, the edge data network 2000 is referred to as an MEC server. Referring to FIG. 1, the edge data network 2000 may include a first edge application 142, a second edge application 144, and an edge enabler server (or an MEC platform (MEP)) 146. The edge enabler server 146 provides an MEC service or performs a traffic control or the like in the edge data network 2000, and the edge enabler server 146 is described below in detail.

According to an embodiment, the edge data network 2000 may execute a plurality of applications. For example, the edge data network 2000 may execute the first edge application 142 and the second edge application 144. According to an embodiment, the edge application may refer to an application provided by a third party in the edge data network that provides the MEC service, or may be referred to as an edge application. The edge application may be used to establish a data session with the application client to transmit and receive data related to the application client. That is, the edge application may establish a data session with the application client. In an embodiment, a data session may refer to a communication path established for an application client in the electronic device 1000 and an edge application in the edge data network 2000 to transmit and receive data to and from each other.

According to an embodiment, an application in the edge data network 2000 may be referred to as an MEC application (or an MEC app), an ME (MEC) app, an edge application server, and an edge application. For convenience, hereinafter, in the present disclosure, an application in the edge data network 2000 is referred to as an edge application. Herein, although the term 'application' is used, the edge application may refer to an application server existing in the edge data network 2000.

According to an embodiment, the cloud server 3000 may provide content associated with an application. For example, the cloud server 3000 may be managed by a content provider. According to an embodiment, the cloud server 3000 may transmit and receive data to and from the electronic device 1000 via an external DN (e.g., the Internet).

A core network (CN) and a DN may exist between the AN 1100 and the edge data network 2000. According to an embodiment, the DN may provide a service (e.g., an Internet service or an internet protocol multimedia subsystem (IMS) service) to the electronic device 1000 by transmitting and receiving data (or data packets) to and from the electronic device 1000 via the CN and the AN 1100. For example, the DN may be managed by a communication provider. In an embodiment, the edge data network 2000 may be connected to the AN 1100 or the CN via the DN (e.g., a local DN).

According to an embodiment of the present disclosure, in a case in which the first application client 122 or the second application client 124 is executed by the electronic device 1000, the electronic device 1000 may access the edge data network 2000 via the AN 1100 to transmit and receive data for executing an application client.

In the present disclosure, a method of streaming image content among the electronic device 1000, the edge data network 2000, and the cloud server 3000 described above may be provided. In more detail, a method of effectively providing content for VR, AR, or MR to a user, based on the user's interaction information on an image reproduced by the electronic device 1000 is described. Hereinafter, a method, performed by the edge data network 2000, of streaming image content based on orientation information, state information, and rotational speed information of image content reproduced by the electronic device 1000 is described.

Figure 2:
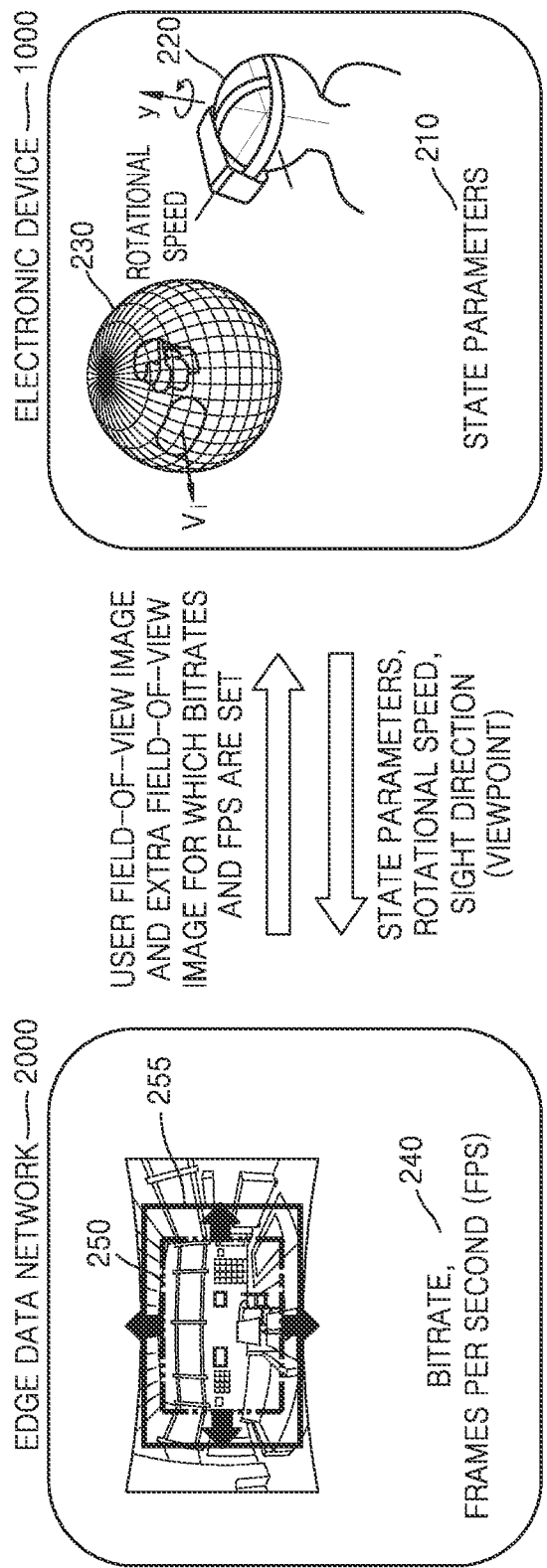
FIG. 2 is a diagram illustrating a method, performed by an edge data network, of adaptively streaming an extended field-of-view (FoV) image including an extra FoV image, considering a user viewpoint (sight direction), state parameters, and a rotational speed, according to an embodiment of the present disclosure.

FIG. 2 is a diagram illustrating a method, performed by the edge data network 2000, of adaptively streaming an extended field-of-view (FoV) image including an extra FoV image, considering a user viewpoint (sight direction), state information, and rotational speed, according to an embodiment of the present disclosure.

Referring to FIG. 2, the electronic device 1000 may transmit, to the edge data network 2000, state information (state parameters 210), a rotational speed 220 of the electronic device 1000, and a user's sight direction (viewpoint) 230 (e.g., orientation information), periodically, upon a request from the edge data network 2000, or upon a change in a value of the information.

Here, the state information may include at least one of 'network state information' or 'connected device state information.' In addition, the network state information may include 'state parameters' 210.

The state parameters 210 may include, but is not limited to, a 'throughput' for processing tasks, such as data transmission and reception through a network connection, which is determined by considering a situation of a network, a situation of the edge data network 2000, or a situation of the electronic device 1000.

The throughput may refer to an amount of data per unit time that may be processed in an end-to-end manner (e.g., a data-related task by the edge data network 2000, data transmission through a network, and processing of a data-related task by the electronic device 1000). For example, the throughput may refer to a size or speed per unit time regarding data transmitted over a network. Alternatively, the throughput may refer to the size of data processed by the edge data network 2000 and the electronic device 1000, or the speed of such data processing. The throughput may be identified based on at least one evaluation index (e.g., the number of received packets, bytes, or bits per unit time).

For example, the electronic device 1000 may measure the total sum of data sizes received per unit time by a receiving module based on a transport protocol, and transmit, to the edge data network 2000, throughput information including the measured value. However, the present disclosure is not limited thereto, and it may be understood by those of skill in the art that various modules may measure a throughput of related data and transmit, to the edge data network 2000, information about the measured throughput.

The connected device state information may be information required for an operation (e.g., image streaming) of the edge data network 2000 and the electronic device 1000. For example, the connected device state information may include capability information of the electronic device 1000. For example, the capability information may be information indicating operation-related capability of the electronic device 1000, for example, information about a size of the viewport area of the electronic device 1000.

In this case, the orientation information may include angle values of a gaze of the user of the electronic device 1000, which are measured by using a sensing module of the electronic device 1000. For example, the electronic device 1000 may perform sensing to obtain orientation information (e.g., roll, pitch, and yaw values) of a gaze of the user looking at a certain partial image in a VR image by using the sensing module (e.g., a three-axis tilt sensor), and the electronic device 1000 may transmit the obtained orientation information to the edge data network 2000, so as to share, with the edge data network 2000, information about at which portion of the VR image the user of the electronic device is currently looking.

The 'rotational speed information' is information about the rotational speed 220 of the head of the user using the electronic device, and may include information about a rotational speed and a rotational direction. For example, the electronic device 1000 may sense an instantaneous rotational speed of the electronic device by using a sensing module (e.g., a three-axis tilt sensor). In this case, the rotational speed may include information about a rotational speed of each angular component, for example, instantaneous angular velocities of roll, pitch, and yaw values.

The electronic device 1000 may share, with the edge data network 2000, information about the current rotational direction and rotational speed of the head of the user of the electronic device (i.e., predicted gaze information about a point at which the user will look later), by transmitting, to the edge data network 2000, rotational speed information obtained by performing sensing.

However, the present disclosure is not limited thereto, and the electronic device 1000 may perform sensing to obtain current orientation information by using the sensing module (e.g., a three-axis tilt sensor), and then obtain a rotational speed of the electronic device based on a difference between previously measured orientation information and the current orientation information.

In a case in which the previous orientation information of the electronic device 1000 is shared with the edge data network 2000, the electronic device 1000 may transmit, to the edge data network 2000, only the current orientation information of the electronic device without separately transmitting the rotational speed information, and the edge data network 2000 may receive the current orientation information of the electronic device, and obtain rotational speed information of the current electronic device based on a difference between the previously received orientation information of the electronic device and the current orientation information.

The edge data network 2000 may set a bitrate of an image and a number of frames per second (FPS) 240 of the image, based on information about the state parameters 210 and the rotational speed 220, and may identify a size of a user FoV image 250 and a position of the user FoV image 250, based on information (e.g., orientation information) about the user's sight direction (viewpoint) 230, and may identify a size of an extra FoV image 255 and a position of the extra FoV image 255, based on the information about the state parameters and the rotational speed, encode the user FoV image 250 and the extra FoV image 255 based on image encoding parameters, such as bitrates and numbers of frames per second of the images, and transmit, to the electronic device 1000, the encoded images. Here, the term 'FoV' refers to the extent to which the user's eyes may view a scene (e.g., a FoV may be expressed as an angle, but is not limited thereto). In a case of viewing an image with a larger FoV, a larger area of the image may be viewed by the user's eyes.

However, the extent to which the user may view an image through a display of the electronic device 1000 may be limited to the size of a viewport area of the electronic device 1000. The size of the viewport area is the size of a FoV with which an image may be reproduced on the display of the electronic device 1000 (i.e., the size of a display area), and the size of the viewport area may be identified according to 'capability information' of the electronic device 1000. That is, the size of the viewport area is one of hardware specifications of the display of the electronic device 1000, and the edge data network 2000 may receive, from the electronic device 1000 via a network connection therewith, the capability information of the electronic device 1000, and identify the size of the viewport area of the electronic device 1000 according to the capability information.

For example, in a case in which the size of the viewport area of the electronic device 1000 in the horizontal direction is 110° and the size of the viewport area of the electronic device 1000 in the vertical direction is 90°, the electronic device 1000 may transmit, to the edge data network 2000 via a network connection, the capability information of the electronic device 1000 including information about the size of the viewport area, and the edge data network 2000 may identify, based on the capability information, that the size of the viewport area in the horizontal direction is 110° and the size of the viewport area in the vertical direction is 90°. Accordingly, the term 'user FoV' (or 'default FoV') may refer to an area viewable by the user through the viewport area of the electronic device 1000.

In a case in which the orientation of the electronic device 1000 is changed according to the movement of the user's head over time, and thus the area of an image viewable by the user is changed, the user is unable to view the entire area of an image being viewed with the existing user FoV, and thus, the term 'extra FoV' may refer to an FoV that is obtained considering such a situation (e.g., upper, lower, left, and right extra FoVs around the user FoV). This is because that, in a case in which the electronic device 1000 is to decode only the encoded user FoV image, and the latest orientation information of the electronic device 1000 at a time point of reproduction is different from the orientation information that was used for the encoding, a part of an image viewed by the user may not be properly reconstructed, and thus, the user may view a black edge, resulting in a hindrance to immersion of the user.

A FoV of a first partial image encoded to be displayed on the electronic device 1000 may be an extended FoV including a user FoV (a default FoV) and an extra FoV. That is, the first partial image may be an extended FoV image including a user FoV image (a default FoV image) and an extra FoV image. That is, with an extra FoV transmitted, the electronic device 1000 may perform decoding to obtain the extra FoV image together with the user FoV image, identify, by using the latest orientation information of the electronic device 1000 at the time point of reproduction, an FoV image to be reproduced from the images obtained in the decoding, and reproduce the FoV image, thereby preventing a black edge from occurring.

The extra FoV image may be an image corresponding to a certain FoV in all directions set as a default, based on the user FoV image. The present disclosure is not limited thereto, and the extra FoV image may be an image corresponding to a FoV adaptively identified considering the state parameters and the rotational speed of the electronic device 1000. By considering the state parameters and the rotational speed of the electronic device 1000, in a case in which the state of a network (or the state of a connection device) is bad (e.g., a throughput measured by a receiving module of the electronic device 1000 is low), or even in the worst case, such as a case in which the rotational speed of the electronic device 1000 is high, it is possible to prevent reproduction from being interrupted, or prevent the user from viewing a black edge when an image is reproduced.

Here, the number of frames per second refers to the number of frames reproduced per second, and as the value increases, an image being reproduced may appear natural, whereas, as the value is decreases, an image being reproduced may appear unnatural and laggy.

The bitrate of an image is one of the parameters indicating the quality of the image, and may indicate, for example, a target number of bits (or bytes or packets) per second in encoding the image. For the same resolution (or size), an encoded image with a higher bitrate may have higher quality than that of the encoded image with a lower bitrate. A bitrate may be used as a parameter input to an encoding module to adjust the image quality of an image.

The resolution of an image refers to the number of pixels of a frame to be encoded, and, for the same pixel size, as the resolution increases, the size and quality of the image may increase. The resolution of an image is related to the size of the image, and thus, it can be considered that, when at least one of the size of the user FoV image and the size of the extra FoV image, which are input to an encoding module, is adjusted, the resolution of the image is changed.

For example, the size of the user FoV image may be fixed considering the size of the viewport area, the size of the extra FoV image may be identified based on information about state parameters and a rotational speed, and accordingly, as the size of the extra FoV image increases, the resolution of the image may increase.

For example, in a case in which the value of at least one of the state parameters was greater than or equal to a preset threshold (in the previous state) and is currently less than the preset threshold (in the current state), in order to guarantee frames to be rendered (guarantee frames to be reproduced), the edge data network 2000 may set the bitrate and the number of frames per second of the image to be less than those in the previous state, and transmit an additional extra FoV image considering the changed bitrate and number of frames per second. As the number of frames per second decreases, an interval between displayed frames increases, resulting in an increase in a time period between the frames in which the electronic device 1000 may move, and accordingly, the size of the extra FoV image may be set to be larger considering the time period in which the electronic device 1000 may move.

Therefore, it is possible to continuously guarantee a motion-to-photon (MTP) latency that does not affect immersion of the user.

The MTP latency may refer to a period of time during which the edge data network 2000 identifies a movement of the user (e.g., a movement of the gaze of the user) based on sensor information (e.g., orientation information) obtained through the sensing module of the electronic device 1000 and transmitted to the edge data network 2000, the edge data network 2000 provides a frame of a partial image in the VR image based on the sensor information, and the electronic device 1000 performed decoding and rendering on the provided frame of the partial image and then displays the rendered frame on the display.

That is, when encoding a high-quality image and transmitting the encoded image with a poor network state or connection device state, the latency increases, thus transmission of the image is delayed, resulting in an influence on immersion of the user, and thus, in order to reduce the latency, the quality of the image to be encoded may be lowered by lowering the bitrate of the image and lowering the number of frames per second. However, when an extra FoV image having the same size as that in the previous state is received even though the number of frames per second has been changed, orientation information updated according to the latest orientation information of the electronic device 1000 at a time point of reproduction has a large difference from the previous orientation information, the probability of viewing a black edge may increase, and thus, the size of the extra FoV image large may be set considering the number of frames per second to minimize the black edge.

That is, until receiving a subsequent frame (e.g., a second frame) based on subsequent orientation information, the edge data network 2000 may obtain, based on the latest orientation information obtained from the sensing module, a latest user FoV image from a first partial image 200 obtained from a first frame. Accordingly, even when an MTP latency until a time point at which the second frame is received substantially increases, the edge data network 2000 may prevent the user from seeing a black edge, by performing local processing based on the extra FoV image, so as to achieve a sufficient offset for a time period required for receiving the second frame, thereby substantially compensating for the MTP latency. Alternatively, for example, when the rotational speed of the electronic device 1000 is greater than a preset threshold, the edge data network 2000 may transmit an additional extra FoV image.

That is, when the rotational speed of the electronic device 1000 is high, the difference between the orientation information at a time point of reproduction and the orientation information used for encoding the partial image, and, in a case in which the size of the extra FoV image is insufficient, the user is more likely to view a black edge, which may bring a hindrance to immersion of the user. In this case, the edge data network 2000 may minimize the occurrence of black edges by setting the size of the extra FoV image to be large. However, as the size of the extra FoV image increases, the size of data obtained by encoding the extra FoV image may increase, and accordingly, the MTP latency may increase somewhat and the bandwidth may increase.

In order to reduce the MTP latency and the bandwidth, the bitrate of an image may be reduced. Also, the number of frames per second of an image may be reduced. When the number of frames per second is reduced, considering that, as the interval between frames to be displayed increases, a time period during which a movement may occur just before a time point of reproduction may also increase, the size of the extra FoV image may be additionally set to be large to guarantee the MTP latency. In addition, because a subsequent viewpoint of the user may be predicted based on the rotational speed of the electronic device 1000, the possibility of the occurrence of black edges may be minimized by securing an extra FoV image that is extended in the rotational direction, and the bandwidth and MTP latency may be guaranteed by appropriately increasing the size of data of the image to be encoded.

FIG. 3 is a flowchart illustrating an operation procedure between an electronic device and an edge data network, according to an embodiment of the present disclosure. Referring to FIG. 3, in operation S300, the edge data network 2000 may establish a network connection with the electronic device 1000, and may share, with the electronic device 1000, connected device state information required for operations of the edge data network 2000 and the electronic device 1000. In this case, the state information may be shared only initially, periodically, or aperiodically only upon reception of a request or upon the occurrence of a change in the state information.

For example, the edge data network 2000 may receive, from the electronic device 1000, capability information of the electronic device 1000. For example, the capability information may be information indicating operation-related capability of the electronic device 1000, for example, information about the size of the viewport area of the electronic device 1000.

The present disclosure is not limited thereto, and the edge data network 2000 may receive throughput information from the electronic device 1000. For example, the throughput information may be information about the amount of data received per unit time by a receiving module. Alternatively, the edge data network 2000 may obtain latency information from the electronic device 1000.

For example, the edge data network 2000 may transmit certain data according to a request of the electronic device 1000, the electronic device 1000 may receive the data and at this time, the receiving module of the electronic device 1000 may measure a network latency, and the electronic device 1000 may transmit information about the network latency to the edge data network 2000.

In operation S302, the electronic device 1000 may obtain sensor information including at least one of orientation information and rotational speed information. The orientation information may be information indicating an angle component. The rotational speed information may be obtained directly from the sensing module or may be obtained based on a difference between the orientation information at the current time point, which is obtained from the sensing module, and orientation information at a previous time point.

In operation S304, the electronic device 1000 may transmit, to the edge data network 2000, the sensor information including at least one of the orientation information or the rotational speed information. The electronic device 1000 may periodically transmit the sensor information to the edge data network 2000, but is not limited thereto, and may aperiodically transmit the sensor information to the edge data network 2000. For example, the electronic device 1000 may transmit the sensor information only upon a request from the edge data network 2000 or a change in a value of the sensor information.

In operation S306, the edge data network 2000 may identify a user FoV image based on the orientation information. For example, the edge data network 2000 may identify the position of the user FoV image based on the received orientation information.

In operation S308, the edge data network 2000 may identify at least one of a size, a position, a bitrate and a number of frames per unit time of a first partial image, based on at least one of rotational speed information or state information (including at least one of network state information or the connected device state information). In this case, because a reference coordinate position of the first partial image corresponds to the orientation information, and the reference coordinate position of the user FoV image also corresponds to the orientation information, the reference coordinate position of the first partial image (e.g., a coordinate position of the center of the image) may be the same as the reference coordinate position of the user FoV image (e.g., a coordinate position of the center of the image), but is not limited thereto. For example, in a case in which the reference coordinate position of an image indicates an upper left position of the image, the reference coordinate position of the first partial image and the reference coordinate position of the user FoV image may be different from each other.

In a case in which the edge data network 2000 does not separately receive the rotational speed information from the electronic device 1000, the rotational speed information may be obtained based on a difference between the currently obtained orientation information and previously obtained orientation information.

For example, in a case in which the value of at least one state parameter related to at least one state of a network state and a connected device state included in the state information is less than or equal to a first threshold, the edge data network 2000 may identify a size and a number of frames of the first partial image, which correspond to the at least one state parameter that is less than or equal to the first threshold. In this case, the first threshold may be a value set on the assumption that at least one state parameter before the current time point is greater than the first threshold.

In a case in which the value of at least one state parameter included in the state information is greater than a second threshold, the edge data network 2000 may identify a size of the first partial image and a number of frames per unit time of the first partial image, which correspond to the at least one state parameter that is greater than the second threshold. In this case, the second threshold may be a value set on the assumption that at least one state parameter before the current time point is less than or equal to the second threshold. The first threshold may be equal to the second threshold, but is not limited thereto.

In this case, the size of the first partial image corresponding to the at least one state parameter that is less than or equal to the first threshold may be greater than the size of the partial image corresponding to the at least one state parameter that is greater than the second threshold.

In addition, the number of frames per unit time of the first partial image corresponding to the at least one state parameter that is less than or equal to the first threshold may be less than the number of frames per unit time of the first partial image corresponding to the at least one state parameter that is greater than the second threshold.

In this case, the first partial image may include a user FoV image corresponding to the orientation information and an extra FoV image corresponding to the number of frames per unit time. The user FoV image may be obtained based on the information about the size of the viewport area of the electronic device 1000. In addition, the extra FoV image may correspond to the number of frames per unit time. A size of a first extra FoV image (when the number of frames per unit time is a first value (e.g., 60 fps)) may be less than a size of a second extra FoV image (when the number of frames per unit time is a second value (e.g., 30 fps), which is less than the first value).

The edge data network 2000 may additionally identify the bitrate of the first partial image based on the state information. In a case in which the value of at least one state parameter is less than or equal to the first threshold, the edge data network 2000 may identify the bitrate of the first partial image corresponding to the at least one state parameter that is less than or equal to the first threshold.

In a case in which the value of at least one state parameter is greater than the second threshold, the edge data network 2000 may identify the bitrate of the first partial image corresponding to the at least one state parameter that is greater than the second threshold.

The bitrate of the first partial image corresponding to the at least one state parameter that is less than or equal to the first threshold may be less than the bitrate of the partial image corresponding to the at least one state parameter that is greater than the second threshold.

In a case in which the rotational speed of the rotational speed information is greater than the first threshold, the edge data network 2000 may identify a size of the first partial image, which corresponds to the rotational speed that is greater than the first threshold.

In addition, in a case in which the rotational speed of the rotational speed information is less than or equal to the second threshold, the edge data network 2000 may identify a size of the first partial image, which corresponds to the rotational speed that is less than or equal to the second threshold.

In this case, the size of the first partial image corresponding to the rotational speed that is greater than the first threshold may be greater than the size of the first partial image corresponding to the rotational speed that is less than or equal to the second threshold.

According to an embodiment, a first partial image may include a (user) FoV image corresponding to orientation information, and an extra FoV image corresponding to at least one of a rotational speed and a rotational direction of rotational speed information.

Alternatively, according to an embodiment, a first partial image may include a FoV image corresponding to orientation information, and an extra FoV image, which is identified based on at least one of a rotational speed of rotational speed information or a rotational direction of rotational speed information, and the number of frames per unit time. In this case, the number of frames per unit time may be identified based on the rotational speed, but is not limited thereto.

An extra FoV image may include a first extra FoV image in a rotational direction with respect to a FoV image and a second extra FoV image in a direction opposite to the rotational direction, and the first extra FoV image may be larger than the second extra FoV image. That is, as the size of an FoV image in the rotational direction with respect to the FoV image is identified to be larger than the size of an FoV image in the opposite direction (that is, the FoV image are identified to be asymmetric with each other), black edges may not occur while adequately securing an extra FoV.

Based on rotational speed information, the edge data network 2000 may identify an extra FoV, which is preset in a lookup table (LUT), and identify an extra FoV image based on the identified FoV.

According to another embodiment, the edge data network 2000 may further identify the number of frames per unit time as well as the size of the first partial image, according to the rotational speed.

In a case in which the rotational speed of the rotational speed information is greater than the first threshold, the edge data network 2000 may identify a size and a number of frames per unit time of the first partial image, which correspond to the rotational speed that is greater than the first threshold.

In a case in which the rotational speed of the rotational speed information is less than or equal to the second threshold, the edge data network 2000 may identify a size and a number of frames per unit time of the first partial image, which correspond to the rotational speed that is less than or equal to the second threshold.

In this case, the size of the first partial image corresponding to the rotational speed that is greater than the first threshold may be greater than the size of the first partial image corresponding to the rotational speed that is less than or equal to the second threshold. In addition, the number of frames per unit time of the first partial image corresponding to the rotational speed that is greater than the first threshold may be greater than the number of frames per unit time of the first partial image corresponding to the rotational speed that is less than or equal to the second threshold.

According to another embodiment, the edge data network 2000 may identify the bitrate of a first image according to a rotational speed. In a case in which the rotational speed is greater than the first threshold, the edge data network 2000 may identify the bitrate of the first image corresponding to the rotational speed that is greater than the first threshold.

In addition, in a case in which a rotational speed of rotational speed information is less than or equal to the second threshold, the edge data network 2000 may identify the bitrate of the first image corresponding to the rotational speed that is less than or equal to the second threshold.

In this case, the bitrate of the first partial image corresponding to the rotational speed that is greater than the first threshold may be less than the bitrate of the first partial image corresponding to the rotational speed that is less than or equal to the second threshold.

According to an embodiment, the edge data network 2000 may identify at least one of a size, a position, a bitrate, and a number of frames per unit time of the first partial image by overall considering the state information and the rotational speed information.

For example, when the value of at least one state parameter included in the state information is less than or equal to the first threshold, and the rotational speed of the rotational speed information is greater than a third threshold, the edge data network 2000 may identify a number of frames per unit time and a bitrate of the first partial image corresponding to the at least one state parameter that is less than or equal to the first threshold. Also, the edge data network 2000 may identify a size of the first partial image, which corresponds to the rotational speed that is greater than the third threshold.

In a case in which the value of at least one state parameter is greater than the second threshold, and the rotational speed of the rotational speed information is less than or equal to a fourth threshold, the edge data network 2000 may identify a number of frames per unit time and a bitrate corresponding to the at least one parameter that is greater than the second threshold. Also, the edge data network 2000 may identify a size of the first partial image, which corresponds to the rotational speed that is less than or equal to the fourth threshold.

In this case, the number of frames per unit time and the bitrate of the first partial image corresponding to the at least one state parameter that is less than or equal to the first threshold may be less than the number of frames per unit time and the bitrate of the first partial image corresponding to the at least one state parameter that is greater than the second threshold.

In this case, the size of the first partial image corresponding to the rotational speed that is greater than the third threshold may be greater than the size of the first partial image corresponding to the rotational speed that is less than or equal to the fourth threshold.

Although it is described above that the edge data network 2000 identifies a bitrate and a number of frames per unit time of a first partial image corresponding to state information, and identifies a size of the first partial image, which corresponds to rotational speed information, this is only an example, the present disclosure is not limited thereto, and it may be understood that at least one of a size, a position, a bitrate, and a number of frames per unit time of the first partial image, which correspond to the state information and the rotational speed information, may be identified by overall considering the state information and the rotational speed information.

In operation S310, the edge data network 2000 may generate a first frame by encoding the first partial image based on at least one of the size, the position, the bitrate, or the number of frames per unit time of the first partial image, which are identified in operation S308.

In operation S312, the edge data network 2000 may transmit, to the electronic device 1000, the first frame generated in operation S310.

In operation S314, the electronic device 1000 may reconstruct the first partial image by decoding the first frame received from the edge data network 2000. In this case, the reconstructed first partial image may include the extra FoV image.

In operation S316, the electronic device 1000 may reproduce the reconstructed first partial image. In this case, a partial image of the reconstructed first partial image may be obtained based on orientation information at a time point of the reproduction, and the obtained partial image may be reproduced.

FIG. 4 is a diagram schematically illustrating an operation procedure between an electronic device and an edge data network.

According to an embodiment, the electronic device 1000 may include a sensing module 410, a network interface 420, a processor 430, and a memory 440. However, components in the electronic device are not limited thereto, and the electronic device may include more or fewer components.

The electronic device 1000 may decode images received from the edge data network 2000 or the cloud server 3000, and display the decoded images, on the display of the electronic device 1000. Also, the electronic device 1000 may obtain sensor information including at least one of orientation information and rotational speed information regarding reproduced images by using the sensing module 410. The orientation information may include angle values of a gaze of the user of the electronic device, which are measured by using the sensing module. The rotational speed information may include amounts of instantaneous changes in angle values of a gaze of the user of the electronic device, which are measured by using the sensing module.

The electronic device 1000 transmits the sensor information including at least one of orientation information and the rotational speed information 452 to the edge data network 2000 by using the network interface 420. In this case, the electronic device 1000 may transmit, to the edge data network 2000, frame index information obtained when the orientation information and the rotational speed information are sensed. However, the present disclosure is not limited thereto, and reference frame information among reconstructed frames may be transmitted to the edge data network 2000 before the orientation information and the rotational speed information are sensed. Here, the frame index may be information indicating an encoding/decoding order of a frame, but is not limited thereto, and may be information indicating a rendering order of the frame.

The processor 430 controls the overall operation of the electronic device 1000 by executing one or more instructions in the memory 440. For example, the processor 430 may control the sensing module 410 and the network interface 420 by executing the one or more instructions stored in the memory 440. According to an embodiment, the processor 430 may obtain a first frame generated by encoding a first partial image according to at least one of a size, a position, a bitrate, or a number of frames per unit time of the first partial image, which are identified based on at least one of state information or rotational speed information. In this case, the first frame may be an intra-coded frame (I frame) or a predictive-coded frame (P frame) (or a bidirectional predicted frame (B-frame)).

In addition, according to an embodiment, the processor 430 may receive, from the edge data network 2000, a frame 454 generated by performing encoding, and reconstruct the first partial image by decoding the frame 454.

The processor 430 may obtain orientation information at a time point of reproduction, and may reproduce a part of the reconstructed first partial image based on the obtained orientation information.

According to an embodiment, the memory 440 may include a decoder module 442 storing instructions for decoding frames generated through encoding and then received from the edge data network 2000, but is not limited thereto.

According to an embodiment, the edge data network 2000 may include a network interface 460, a processor 470, and a memory 480. However, components of the edge data network 2000 are not limited thereto, and the edge data network 2000 may include more components, or some components may be omitted therefrom.

The edge data network 2000 may obtain, from the electronic device 1000, the sensor information including the orientation information and the rotational speed information by using the network interface 460, and transmit, to the electronic device 1000, a frame generated by the edge data network 2000 performing encoding based on the sensor information and the like.

The processor 470 controls the overall operation of the edge data network 2000 by executing one or more instructions in the memory 480.

For example, the processor 470 may identify a parameter of the frame based on at least one of the state information or the rotational speed information. In detail, the processor 470 may identify at least one of a size, a position, a bitrate, or a number of frames per unit time of the first partial image, based on at least one of the state information or the rotational speed information. This is described above with respect to FIG. 4, and thus a detailed description thereof is omitted.

The processor 470 may generate the first frame by obtaining and encoding the first partial image corresponding to the orientation information, based on at least one of the size, the bitrate, or the number of frames per unit time of the first partial image. The processor 470 may transmit the first frame to the electronic device 1000.

According to an embodiment, the memory 480 may include an encoder module 482 storing instructions for encoding images to be transmitted by the edge data network 2000 to the electronic device 1000, and an encoding-generated-frame parameter identification module 484 storing instructions for identifying a parameter of a frame generated by performing encoding, and may store a VR sequence 486 including entire image data for a VR sequence, but is not limited thereto.

For example, the edge data network 2000 may store, in a database (DB), a VR sequence including all frames. The edge data network 2000 may identify a user FoV image and the like in the VR sequence stored in the DB by using the orientation information obtained from the electronic device 1000.

Figure 5A:
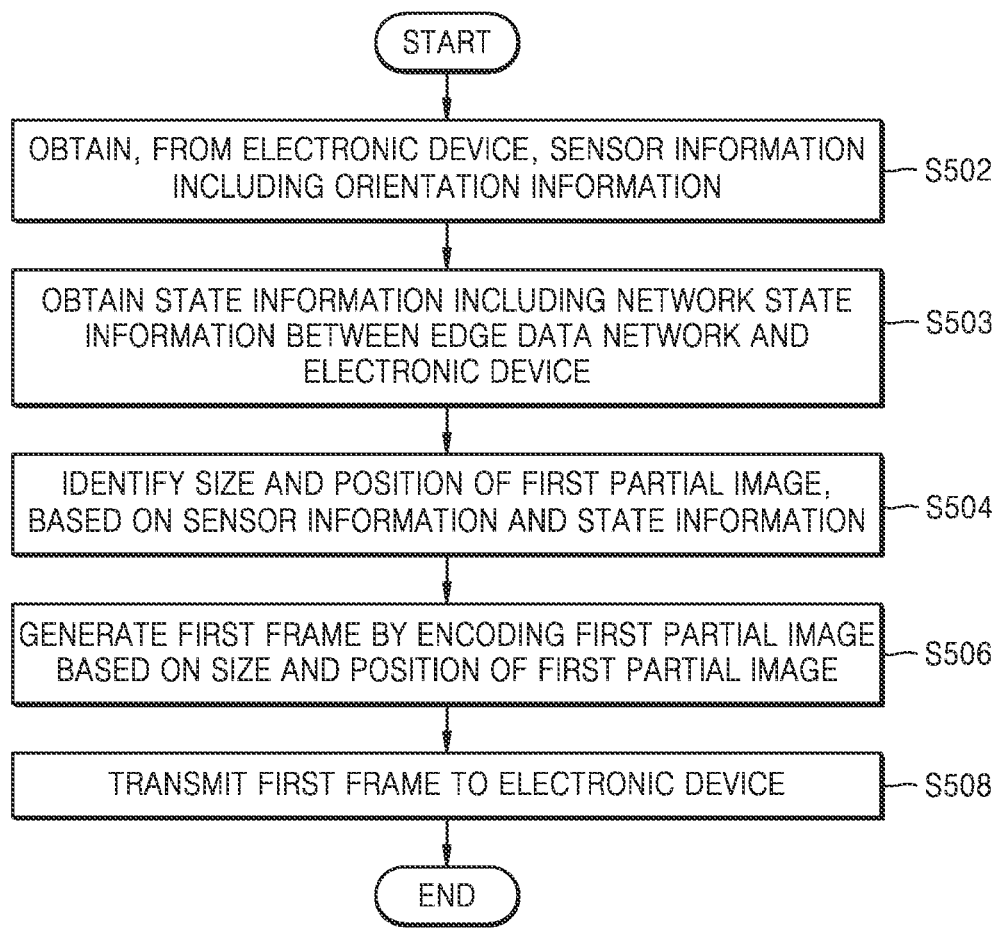
FIG. 5A is a flowchart illustrating a method, performed by an edge data network, of streaming image content, according to an embodiment of the present disclosure.

FIG. 5A is a flowchart illustrating a method, performed by an edge data network, of streaming image content, according to an embodiment of the present disclosure.

Referring to FIG. 5A, in operation S502, the edge data network 2000 may obtain, from the electronic device, sensor information including orientation information. The sensor information may further include rotational speed information.

In operation S503, the edge data network 2000 may obtain state information including network state information between the edge data network 2000 and the electronic device 1000. The state information may further include connected device state information.

In operation S504, the edge data network 2000 may identify a size and a position of a first partial image, based on the sensor information and the state information. The edge data network 2000 may identify at least one of a size, a position, a bitrate, and a number of frames per unit time of the first partial image, based on the sensor information and the state information. This is described above with reference to FIG. 3.

In operation S506, the edge data network 2000 may generate a first frame by encoding the first partial image corresponding to the orientation information, based on at least one of the size, the position, the bitrate, or the number of frames per unit time of the first partial image.

In operation S508, the edge data network 2000 may transmit the first frame to the electronic device 1000.

Figure 5B:
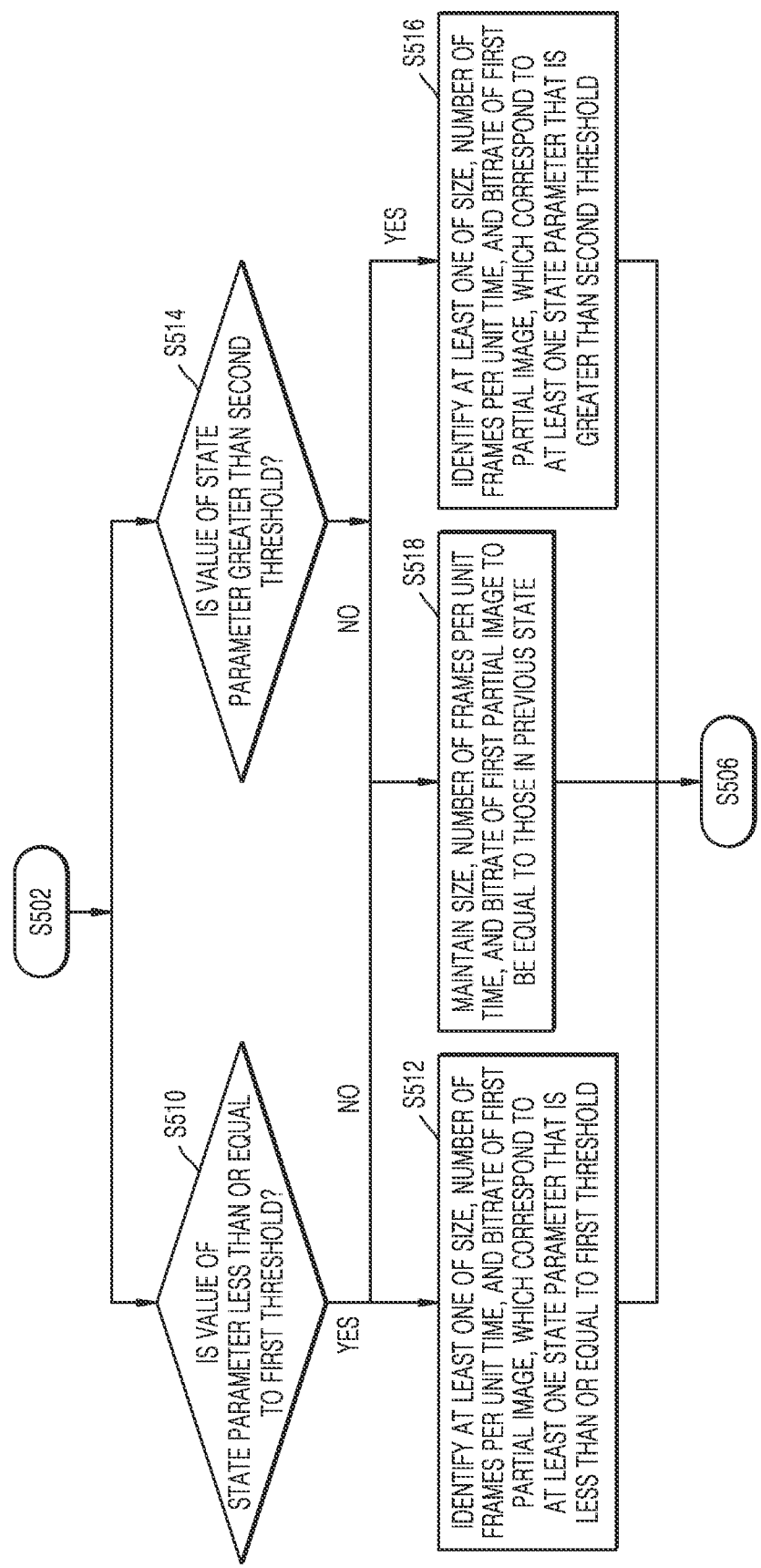
FIG. 5B is a diagram for describing in detail a method, performed by the edge data network, of identifying, based on state information, a parameter of a frame generated by encoding a first partial image, according to an embodiment of the present disclosure.

FIG. 5B is a diagram for describing in detail a method, performed by the edge data network 2000, of identifying, based on state information, a parameter of a frame generated by encoding a first partial image, according to an embodiment of the present disclosure.

Referring to FIG. 5B, in operation S510, the edge data network 2000 may identify whether a value of at least one state parameter related to at least one of a network state and a connected device state included in state information is less than or equal to a first threshold.

In operation S512, in a case in which a value of at least one state parameter included in the state information is less than or equal to the first threshold, The edge data network 2000 may identify at least one of a size, a number of frames per unit time, and a bitrate of the first partial image, which correspond to the at least one state parameter that is less than or equal to the first threshold. In this case, the first threshold may be a value set on the assumption that a value of at least one previous state parameter is greater than the first threshold, and, here, consequently, the identified size of the first partial image may be greater than the size of the first partial image in the previous state. Also, the identified number of frames per unit time of the first partial image may be less than the number of frames per unit time of the first partial image in the previous state. The identified bitrate of the first partial image may be less than the bitrate of the first partial image in the previous state.

In operation S514, the edge data network 2000 may identify whether a value of at least one state parameter related to at least one of the network state and the connected device state included in the state information is greater than a second threshold.

In operation S516, when a value of at least one state parameter is greater than the second threshold, The edge data network 2000 may identify at least one of a size, a number of frames per unit time, and a bitrate of the first partial image, which correspond to the at least one state parameter that is greater than the second threshold.

In this case, the second threshold may be a value set on the assumption that a value of at least one previous state parameter is less than or equal to the second threshold, and, here, consequently, the identified size of the first partial image may be less than the size of the first partial image in the previous state. Also, the identified number of frames per unit time of the first partial image may be greater than the number of frames per unit time of the first partial image in the previous state. The identified bitrate of the first partial image may be greater than the bitrate of the first partial image in the previous state.

In operation S518, in a case in which a value of at least one state parameter related to at least one of the network state and the connected device state included in the state information is greater than the first threshold, The edge data network 2000 may maintain the size of the first partial image, the number of frames per unit time, or the bitrate of the first partial image, to be equal to those in the previous state.

In addition, in a case in which a value of at least one state parameter related to at least one of the network state and the connected device state included in the state information is less than or equal to the second threshold, the edge data network 2000 may maintain the size of the first partial image, the number of frames per unit time, and the bitrate of the first partial image, to be equal to those in the previous state.

In this case, the first threshold and the second threshold may be different from each other, but are not limited thereto, and may be equal to the each other. In this case, it may be understood by those of skill in the art that operation S518 is not performed.

The above descriptions are provided with reference to FIG. 5B on the assumption that, as the value of the at least one state parameter increases, the state is better, but the present disclosure is not limited thereto, and it may be understood that, in the opposite case, the edge data network 2000 may operate in a similar manner to that described with reference to FIG. 5B. For example, as the values of some parameters, such as a bit error rate (BER) or a latency increases, the state may be poorer.

It may be understood by those of skill in the art that, in this case, the relationship between each parameter of the encoding-generated frame corresponding to at least one state parameter that is less than or equal to the first threshold, and the respective parameter of the frame corresponding to at least one state parameter that is greater than the second threshold may be reversed from that described above.

Figure 5C:
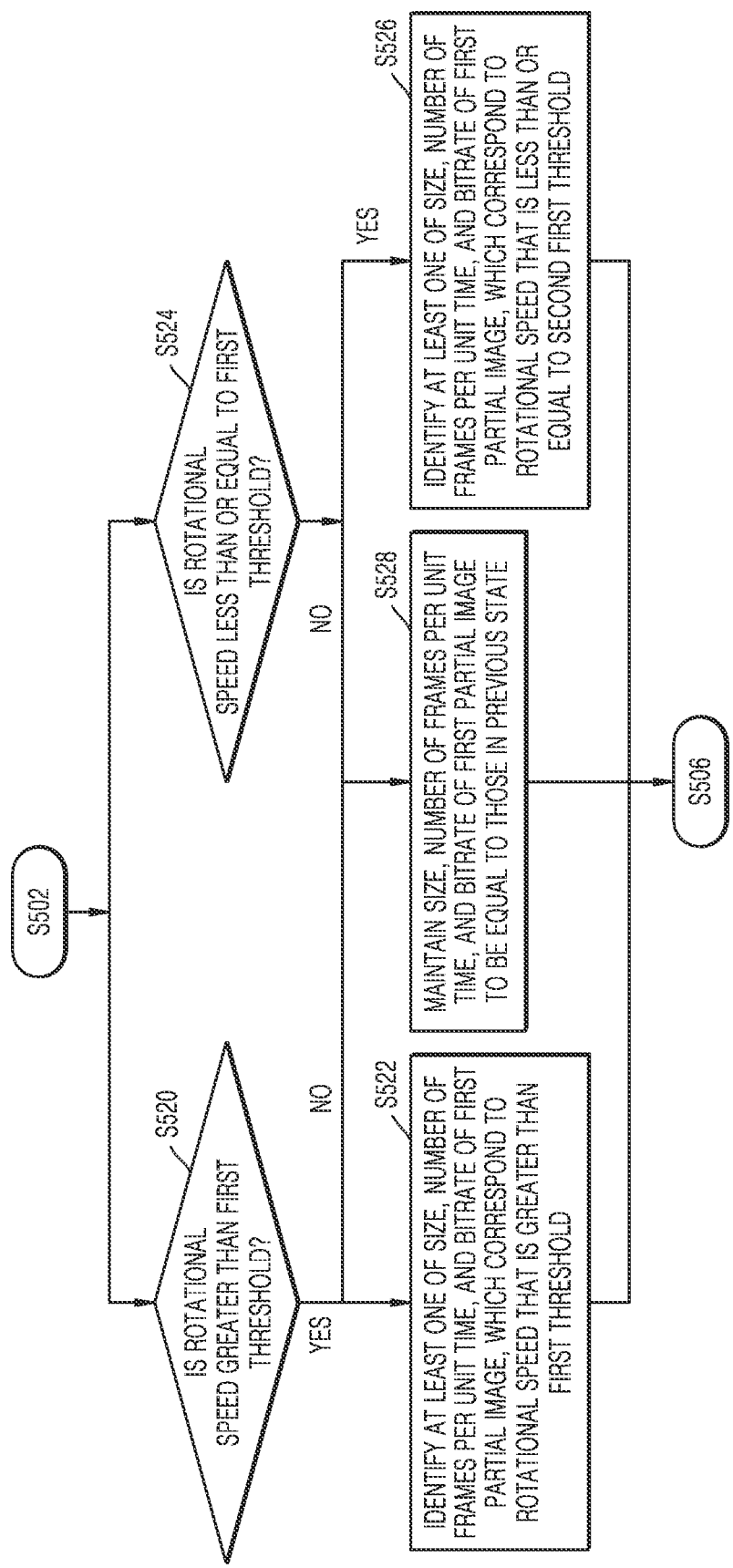
FIG. 5C is a diagram for describing in detail a method, performed by the edge data network, of identifying, based on rotational speed information, a parameter of a frame generated by encoding a first partial image, according to an embodiment of the present disclosure.

FIG. 5C is a diagram for describing in detail a method, performed by the edge data network 2000, of identifying, based on rotational speed information, a parameter of a frame generated by encoding a first partial image, according to an embodiment of the present disclosure.

Referring to FIG. 5C, in operation S520, the edge data network 2000 may identify whether a rotational speed of rotational speed information is greater than a first threshold.

In operation S522, in a case in which the rotational speed of the rotational speed information is greater than the first threshold, the edge data network 2000 may identify at least one of a size, a number of frames per unit time, and a bitrate of the first partial image, which correspond to the rotational speed that is greater than the first threshold.

In this case, the first threshold may be a value set on the assumption that a previous rotational speed is less than or equal to the first threshold, and the identified size of the first partial image may be greater than the size of the first partial image in the previous state. Also, the identified number of frames per unit time of the first partial image may be less than the number of frames per unit time of the first partial image in the previous state. The identified bitrate of the first partial image may be less than the bitrate of the first partial image in the previous state.

In operation S524, the edge data network 2000 may identify whether the rotational speed of the rotational speed information is less than or equal to a second threshold.

In operation S526, in a case in which the rotational speed of the rotational speed information is less than or equal to the second threshold, the edge data network 2000 may identify at least one of a size, a number of frames per unit time, and a bitrate of the first partial image, which correspond to the rotational speed that is less than or equal to the second threshold.

In this case, the second threshold may be a value set on the assumption that the previous rotational speed is greater than the second threshold, and the identified size of the first partial image may be less than the size of the first partial image in the previous state. Also, the identified number of frames per unit time of the first partial image may be greater than the number of frames per unit time of the first partial image in the previous state. The identified bitrate of the first partial image may be greater than the bitrate of the first partial image in the previous state.

In operation S528, in a case in which the rotational speed of the rotational speed information is less than or equal to the first threshold, the edge data network 2000 may maintain the size, the number of frames per unit time, and the bitrate of the first partial image, to be equal to those in the previous state.

In addition, in a case in which the rotational speed of the rotational speed information is greater than the second threshold, the edge data network 2000 may maintain the size, the number of frames per unit time, and the bitrate of the first partial image, to be equal to those in the previous state.

In this case, the first threshold and the second threshold may be different from each other, but are not limited thereto, and may be equal to the each other. In this case, it may be understood by those of skill in the art that operation S528 is not performed.

Figure 5D:
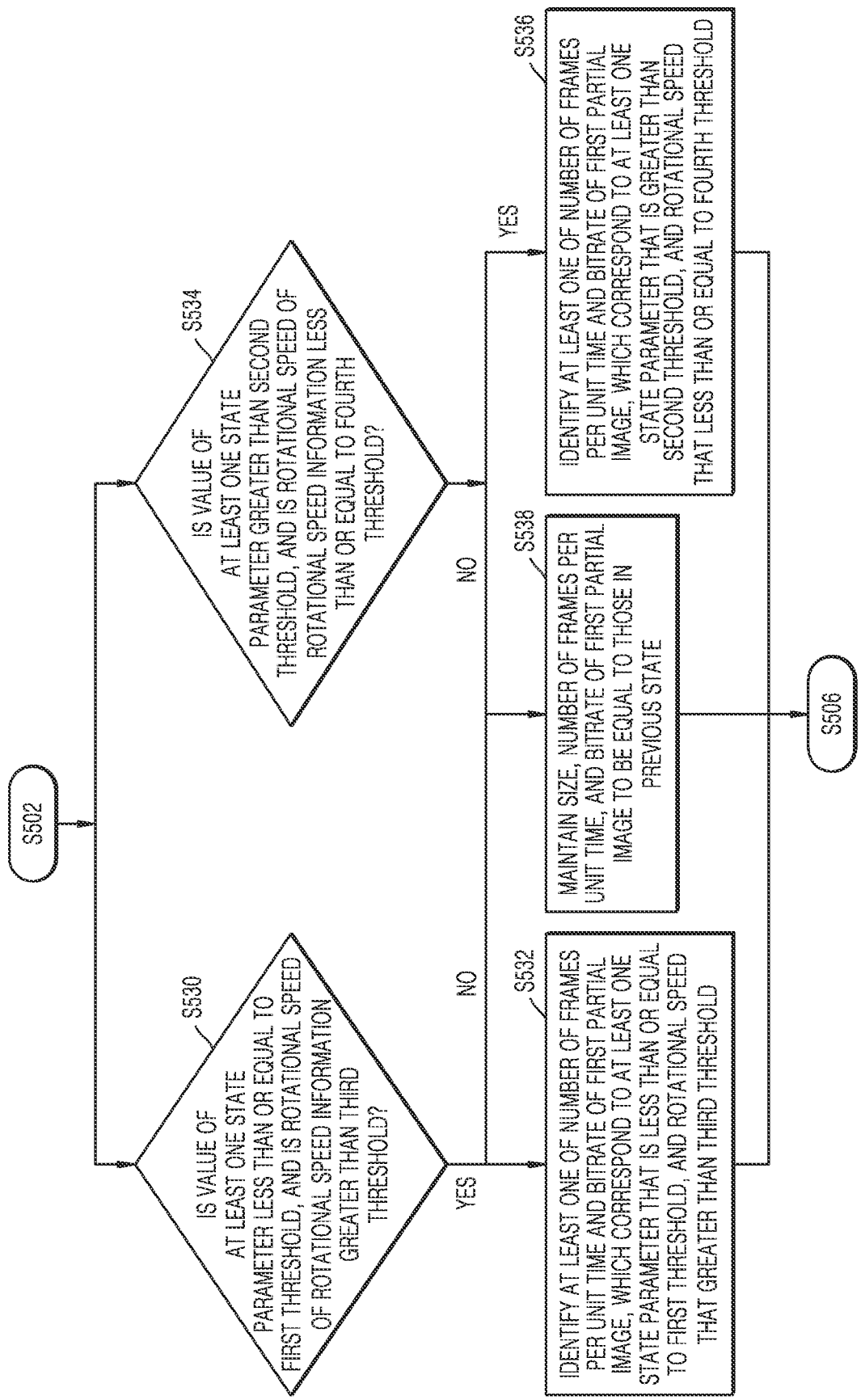
FIG. 5D is a diagram for describing in detail a method, performed by the edge data network, of identifying, based on state information and rotational speed information, a parameter of a frame generated by encoding a first partial image, according to an embodiment of the present disclosure.

FIG. 5D is a diagram for describing in detail a method, performed by the edge data network 2000, of identifying, based on state information and rotational speed information, a parameter of a frame generated by encoding a first partial image, according to an embodiment of the present disclosure.

Referring to FIG. 5D, in operation S530, the edge data network 2000 may identify whether a value of at least one state parameter is less than or equal to a first threshold, and a rotational speed of the rotational speed information is greater than a third threshold.

In operation S532, in a case in which a value of at least one state parameter is less than or equal to the first threshold, and the rotational speed of the rotational speed information is greater than the third threshold, the edge data network 2000 may identify at least one of a number of frames per unit time and a bitrate of the first partial image, which correspond to the at least one state parameter that is less than or equal to the first threshold, and the rotational speed that is greater than the third threshold.

In this case, the first threshold may be a value set on the assumption that a value of at least one of previous state parameters is high, and the third threshold may be a value set on the assumption that the previous rotational speed is less than or equal to the third threshold, and, here, consequently, the identified size of the first partial image may be greater than the size of the first partial image in the previous state. Also, the identified number of frames per unit time of the first partial image may be less than the number of frames per unit time of the first partial image in the previous state. The identified bitrate of the first partial image may be less than the bitrate of the first partial image in the previous state. In this case, the size of the first partial image may be identified corresponding to a state parameter. Also, the number of frames per unit time and the bitrate of the first partial image may be identified to correspond to the rotational speed. However, the present disclosure is not limited thereto, and it may be understood by those of skill in the art that each of identified elements (e.g., the number of frames per unit time and the bitrate of the first partial image) may be identified by overall considering the rotational speed and the state parameters.

For example, the edge data network 2000 may assign weights to the state parameters and the rotational speed, and identify a size, a number of frames per unit time, and a bitrate of the first partial image considering the weights.

In operation S534, the edge data network 2000 may identify whether a value of at least one state parameter is greater than a second threshold, and the rotational speed of the rotational speed information is less than or equal to a fourth threshold.

In operation S536, in a case in which a value of at least one state parameter is greater than the second threshold, and the rotational speed of the rotational speed information is less than or equal to the fourth threshold, the edge data network 2000 may identify at least one of a number of frames per unit time and a bitrate of the first partial image, which correspond to the at least one state parameter that is greater than the second threshold, and the rotational speed that is less than or equal to the fourth threshold.

In this case, the second threshold may be a value set on the assumption that a value of at least one previous state parameter is less than or equal to the second threshold, the fourth threshold may be a value set on the assumption that the previous rotational speed is greater than the fourth threshold, and the identified size of the first partial image may be less than the size of the first partial image in the previous state. Also, the identified number of frames per unit time of the first partial image may be greater than the number of frames per unit time of the first partial image in the previous state. The identified bitrate of the first partial image may be greater than the bitrate of the first partial image in the previous state.

In this case, the size of the first partial image may be identified corresponding to a state parameter. Also, the number of frames per unit time and the bitrate of the first partial image may be identified to correspond to the rotational speed. However, the present disclosure is not limited thereto, and it may be understood by those of skill in the art that each of identified elements (e.g., the number of frames per unit time and the bitrate of the first partial image) may be identified by overall considering the rotational speed and the state parameters.

In operation S538, in a case in which results of the identifying in operations S530 and S534 are 'No', the edge data network 2000 may maintain the size, the number of frames per unit time, and the bitrate of the first partial image, to be equal to those in the previous state. However, the present disclosure is not limited thereto, and in a case in which a value of at least one state parameter is less than or equal to the first threshold, or in a case in which the rotational speed is greater than the third threshold, at least one of a size, a number of frames per unit time, and a bitrate of the first partial image, which correspond to the at least one state parameter that is less than or equal to the first threshold, and the other parameters of the encoding-generated frame that are not identified may be maintained to be equal to those in the previous state. Otherwise, the edge data network 2000 may maintain the size, the number of frames per unit time, and the bitrate of the first partial image to be equal to those in the previous state.

It may be understood by those of skill in the art that the first threshold and the second threshold may be different from each other, and the third threshold and the fourth threshold may be different from each other, but the present disclosure is not limited thereto, and they may be equal to each other, respectively.

Figure 6:
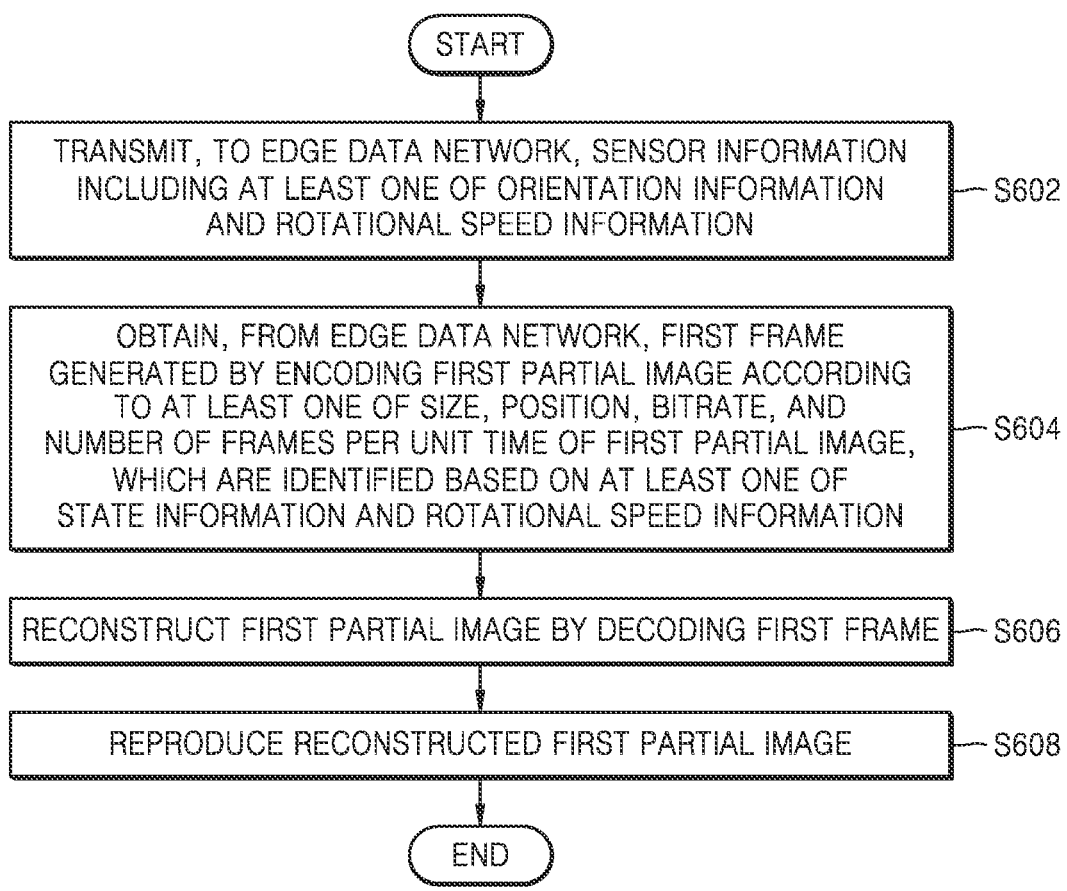
FIG. 6 is a flowchart illustrating a method, performed by an electronic device, of streaming image content obtained from an edge data network, according to an embodiment of the present disclosure.

FIG. 6 is a flowchart illustrating a method, performed by an electronic device, of streaming image content obtained from an edge data network, according to an embodiment of the present disclosure.

In operation S602, the electronic device 1000 may transmit, to the edge data network 2000, sensor information including at least one of orientation information and rotational speed information.

In operation S604, the electronic device 1000 may obtain, from the edge data network 2000, a first frame generated by encoding a first partial image according to at least one of a size, a position, a bitrate, and a number of frames per unit time of the first partial image, which are identified based on at least one of the rotational speed information and state information including network state information and device state information.

In this case, the operation, performed by the edge data network 2000, of identifying at least one of a size, a position, a bitrate, and a number of frames per unit time of the first partial image based on at least one of the state information and the rotational speed information is described above, and thus, a detailed description thereof is omitted.

In operation S606, the electronic device 1000 may reconstruct the first partial image by decoding the first frame.

In operation S608, the electronic device 1000 may reproduce the reconstructed first partial image. In this case, the electronic device 1000 may reproduce a part of the reconstructed first partial image based on the orientation information at a time point of the reproduction.

FIG. 7 is a flowchart illustrating an operation procedure between an electronic device and an edge data network, according to an embodiment of the present disclosure. Referring to FIG. 7, in operation S702, the electronic device 1000 may obtain orientation information. In this case, the electronic device 1000 may additionally obtain rotational speed information, but is not limited thereto.

In operation S704, the electronic device 1000 may transmit the orientation information to the edge data network 2000. In this case, the electronic device 1000 may additionally transmit the rotational speed information. The orientation information and the rotational speed information may be periodically obtained and transmitted, but are not limited thereto.

In operation S706, the electronic device 1000 may transmit, to the edge data network 2000, state information including at least one of a network state and a state of the electronic device 1000. In this case, the transmitted state information may be information about a throughput measured by a particular module of the electronic device 1000, and for example, information about the size of received data per unit time, such as the number of received packets or bits per unit time, measured by a receiving module may be transmitted to the edge data network 2000.

In operation S708, the edge data network 2000 may identify a user FoV image based on the orientation information. For example, the edge data network 2000 may identify the position of the user FoV image based on the received orientation information.

In operation S710, the edge data network 2000 may identify at least one of a size, a position, a bitrate, and a number of frames per unit time of the first partial image based on the state information.

In an embodiment, the edge data network 2000 may determine the bitrate or the number of frames per unit time based on the state information. For example, in a case in which at least one state parameter included in the state information is greater than a first threshold, it may be determined to increase the bitrate or the number of frames per unit time. On the contrary, in a case in which at least one state parameter included in the state information is less than a second threshold, it may be determined to decrease the bitrate or the number of frames per unit time.

Thereafter, the edge data network 2000 may determine the size of the first partial image based on the determined number of frames per unit time. In a case in which the determined number of frames per unit time is greater than the first threshold, the size of the first partial image may be determined to be increased. On the contrary, in a case in which the determined number of frames per unit time is less than the second threshold, the size of the first partial image may be determined to be decreased. The relationship between the number of frames per unit time and the size of the first partial image is described in more detail below with reference to FIGS. 11 and 13.

In another embodiment, the edge data network 2000 may determine at least one of the size, the number of frames per unit time, and the bitrate of the first partial image, based on the state information. This is described in more detail below with reference to FIG. 8.

The other operations are described above with reference to FIG. 3, and thus, detailed descriptions thereof are omitted.

Figure 8A:
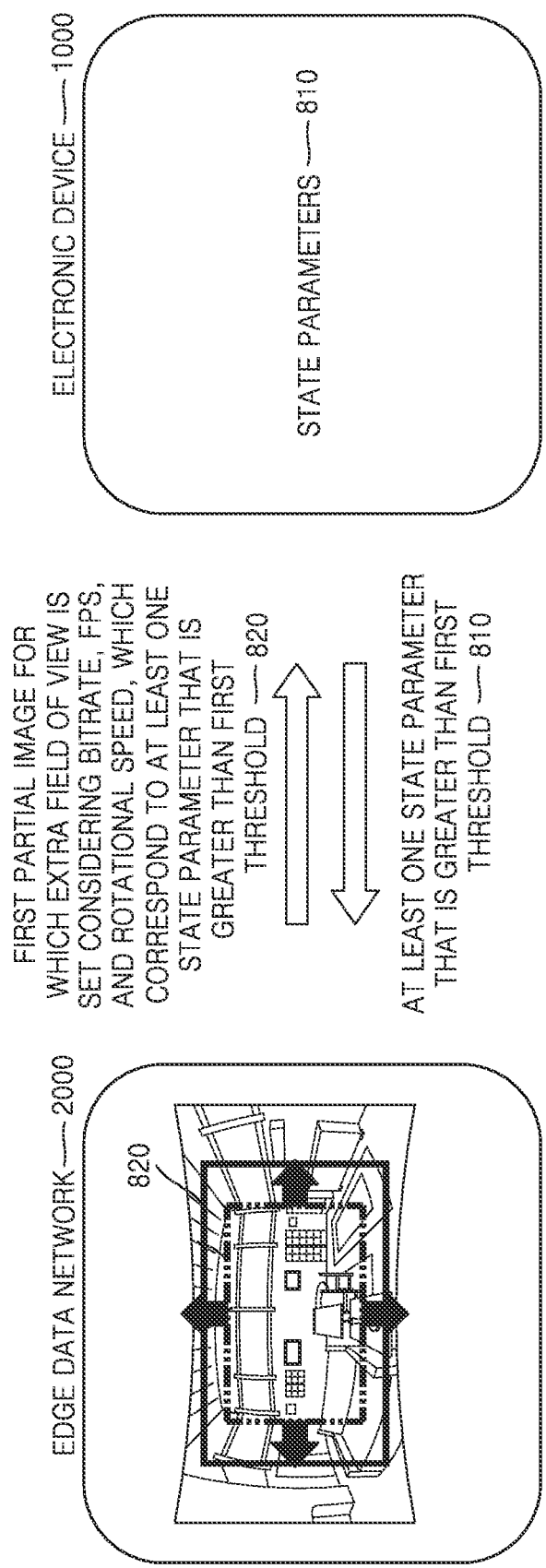
FIG. 8A is a diagram for describing a process, performed by the edge data network, of streaming a first partial image in a case in which at least one state parameter is greater than a first threshold, according to an embodiment.

FIG. 8A is a diagram for describing a process, performed by the edge data network 2000, of streaming a first partial image in a case in which at least one state parameter is greater than a first threshold, according to an embodiment. Referring to FIG. 8A, the electronic device 1000 may transmit information about at least one state parameter to the edge data network 2000, and the edge data network 2000 may receive the information and identify at least one state parameter 810 that is greater than the first threshold. In this case, the state parameter may be information about a throughput. The throughput may be information about at least one of an amount of data processed by the edge data network 2000, an amount of data processed by the electronic device 1000, or an amount of processed data transmitted/received through a network. For example, the electronic device 1000 may measure the amount of data per unit time received by the reception module through the network, and transmit, to the edge data network 2000, information about the measured amount.

The edge data network 2000 may identify at least one state parameter that is greater than the first threshold, set a bitrate corresponding to the at least one state parameter that is greater than the first threshold, encode a first partial image 820 for which an extra FoV is set considering a certain rotational speed, and transmit, to the electronic device 1000, the encoded first partial image 820.

However, the present disclosure is not limited thereto, and it may be understood by those of skill in the art that, when initially connected to the electronic device 1000, the edge data network 2000 may set, as the default, the bitrate and the extra FoV to be the same as those in in the above case, regardless of the first threshold.

Figure 8B:
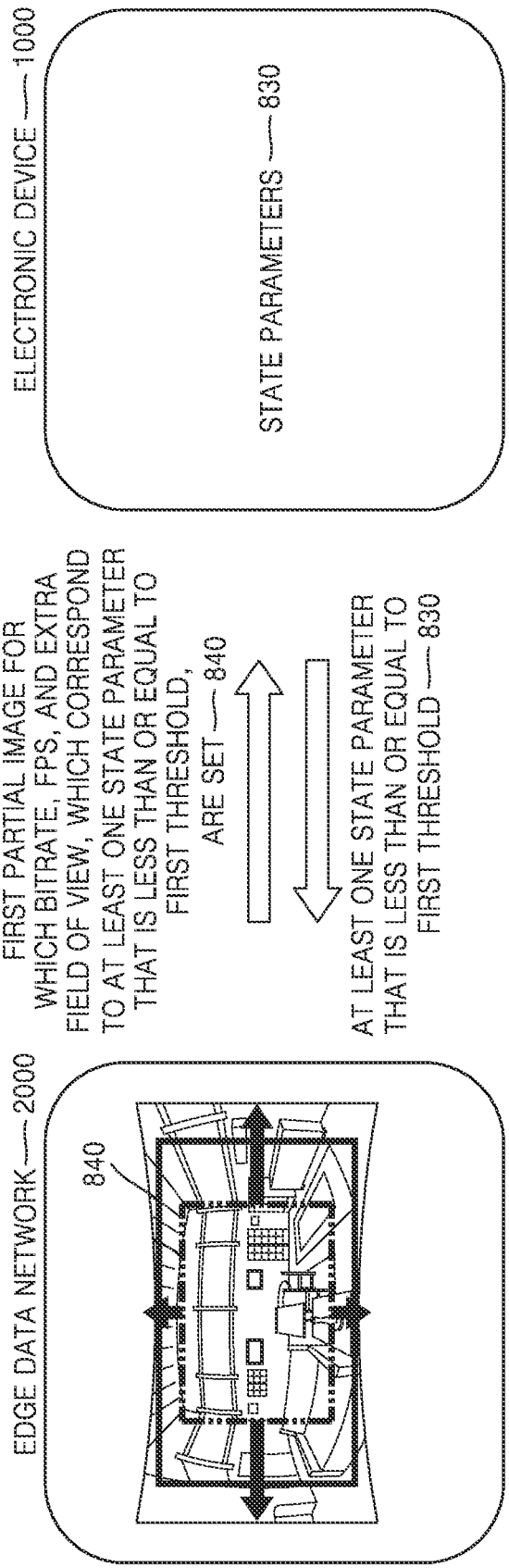
FIG. 8B is a diagram for describing a process, performed by the edge data network, of streaming a first partial image in a case in which at least one state parameter is less than or equal to a first threshold, according to an embodiment.

FIG. 8B is a diagram for describing a process, performed by the edge data network 2000, of streaming a first partial image in a case in which at least one state parameter is less than or equal to a first threshold, according to an embodiment. Referring to FIG. 8B, in a case in which at least one state parameter is a state parameter 830 that is less than or equal to the first threshold, the electronic device 1000 may transmit, to the edge data network 2000, information about the at least one state parameter, and the edge data network 2000 may receive the information and identify the at least one state parameter 830 that is less than or equal to the first threshold. The edge data network 2000 may identify at least one state parameter that is less than or equal to the first threshold, and a bitrate, a FoV, and FPS corresponding to the at least one state parameter that is less than or equal to the first threshold may be set.

In this case, the bitrate may be set to be less than that in a case in which at least one state parameter is greater than the first threshold. The FPS may be set to be less than that in a case in which at least one state parameter is greater than the first threshold. The extra FoV may be set to be wider than that in a case in which at least one state parameter is greater than the first threshold.

The edge data network 2000 may identify at least one state parameter that is less than or equal to the first threshold, encode a first partial image 840 by setting a bitrate, FPS, and an extra FoV, which correspond to the at least one state parameter that is less than or equal to the first threshold, and transmit, to the electronic device 1000, the encoded first partial image 840.

Figure 8C:
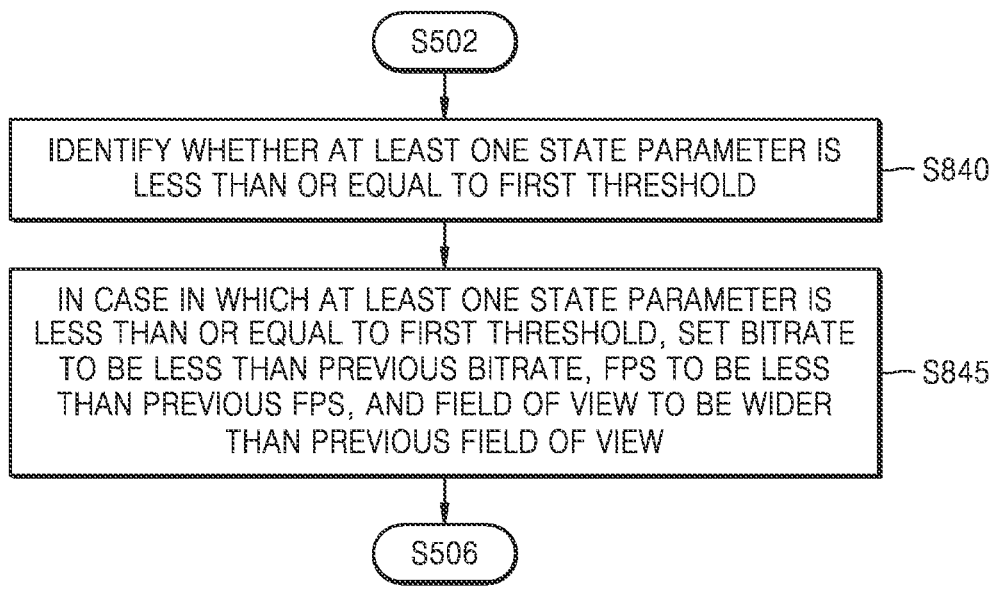
FIG. 8C is a diagram for describing a process, performed by the edge data network, of adaptively changing an encoding-generated-frame parameter in a case in which at least one state parameter is less than or equal to a first threshold, according to an embodiment.

FIG. 8C is a diagram for describing a process, performed by the edge data network 2000, of adaptively changing an encoding-generated-frame parameter in a case in which at least one state parameter is less than or equal to a first threshold, according to an embodiment. Referring to FIG. 8C, in operation S840, in a process of generating a current frame through encoding, the edge data network 2000 may identify whether at least one state parameter is less than or equal to the first threshold. In this case, it is assumed that a previous state parameter is greater than the first threshold and a bitrate, FPS, and an extra FoV, which correspond to the previous state parameter that is greater than the first threshold, are set, or it is assumed that the bitrate, the FPS, and the extra FoV are set as defaults after establishment of a connection with the electronic device 1000. The bitrate, the FPS, and the extra FoV set as defaults may be the same as those corresponding to the at least one state parameter that is greater than the first threshold.

In a case in which at least one state parameter is less than or equal to the first threshold in a process of generating the current frame through encoding, the edge data network 2000 may set the bitrate to be less than the previous bitrate. That is, the quality of the frame to be generated may be reduced. Accordingly, it is possible to prevent frame reproduction by the electronic device 1000 from stopping even though a value of at least one state parameter is decreased.

Also, the edge data network 2000 may set the FPS to be less than the previous FPS. It is possible save a network bandwidth by setting the FPS to be low, and it is possible to prevent frame reproduction by the electronic device 1000 from stopping even though a value of a state parameter (e.g., a throughput measured by the receiving module of the electronic device 1000) is decreased as the frame transmission interval increases.

The edge data network 2000 may set a wider extra FoV considering the lowered FPS. When the FPS is lowered, the frame transmission interval increases, and thus, by setting an extra FoV to be widened by as much as the increase in the interval, an MTP latency may be ensured and asynchronous timewarp (ATW) may be appropriately implemented. Here, ATW refers to a technique for displaying, on a display, an image drawn by a rendering engine based on a rendered frame by modifying the image according to a user's movement.

For example, in a case in which, the FPS among the encoding parameters for the previous frame, i.e., before the edge data network 2000 performs encoding to generate the current frame, is 60 fps and the extra FoV is 0.83° in one direction, and in a process of performing encoding to generate the current frame, at least one state parameter is less than or equal to the first threshold, the FPS in the encoding parameters for the current frame may be 30 fps, and the extra FoV may be set to 1.67° in one direction.

Assuming that a user wearing the electronic device 1000 rotates his or her head 5° in 100 ms (an example of a typical degree of rotation), the user may rotate 0.83° in 16.6 ms with respect to 60 fps, and thus, the edge data network 2000 may set the extra FoV to 0.83° in one direction for encoding for the previous frame, and in a case in which the FPS is lowered to 30 fps, the frame is transmitted 16.6 ms later than that in 60 fps, the angle of rotation by which the electronic device 1000 may move in the interval increases, and thus, the edge data network 2000 may set the extra FoV to be doubled, i.e., to 1.67°, in one direction.

That is, the edge data network 2000 may identify the number of degrees by which the electronic device 1000 rotates for a preset time period, and set the extra FoV based on the following proportional expression.

Preset time:Angle of rotation=Frame transmission
   interval:Extra FoV      [Proportional Expression]

FIG. 8D is a diagram illustrating parameters of an encoding-generated frame being streamed, in a case in which a state parameter is greater than, less than or equal to a first threshold, according to an embodiment.

Referring to FIG. 8D, in a case in which a state parameter is greater than the first threshold, the width and height of an encoding-generated frame 850 being streamed from the edge data network 2000 may be 2500 pixels and 1400 pixels, respectively, the bitrate may be 25 Mbps, and the FPS may be 60 fps.

On the contrary, in a case in which a state parameter is less than or equal to the first threshold, the width and height of an encoding-generated frame 860 being streamed from the edge data network 2000 may be 2600 pixels and 1500 pixels, respectively. The bitrate may be 15 Mbps, and the FPS may be 30 fps.

However, the values of the parameters described above with reference to FIG. 8D are merely examples, and the parameters may have values considering the relationships between relative parameters in cases in which the above-described state parameter is less than or equal to the first threshold and in which it is greater than the first threshold.

As described above with reference to FIGS. 7 to 8D, in a case in which a state parameter is less than or equal to the first threshold, the edge data network 2000 adaptively may identify a bitrate, a number of frames per second, and an extra FoV, thus have a tolerance to a situation in which the value of the state parameter is less than or equal to the first threshold (e.g., a situation in which the amount of data per unit time received by the receiving module is less than or equal to the first threshold), minimize black edges, and continuously guarantee an MTP latency.

FIG. 9 is a flowchart illustrating an operation procedure between an electronic device and an edge data network, according to an embodiment of the present disclosure.

In operation S902, the electronic device 1000 may obtain orientation information and rotational speed information.

In operation S904, the electronic device 1000 may transmit the orientation information and the rotational speed information to the edge data network 2000.

In operation S906, the edge data network 2000 may identify a user FoV image based on the received orientation information. For example, the edge data network 2000 may identify the position of the user FoV image based on the received orientation information.

In operation S908, the edge data network 2000 may determine at least one of the size, the position, the bitrate, or the number of frames per unit time of a first partial image based on the rotational speed information. In this case, the rotational speed information may be received from the electronic device 1000, but is not limited thereto, and may not be directly received from the electronic device 1000 but may be obtained based on a difference between the currently received orientation information and previously received orientation information.

In an embodiment, the edge data network 2000 may determine, based on the rotational speed information, the size and the position of the first partial image including the user FoV image and an extra FoV image surrounding the user FoV image. Thereafter, at least one of the bitrate or the number of frames per unit time of the first partial image may be determined based on the determined size of the first partial image. For example, in a case in which the size of the first partial image is greater than a first threshold, the bitrate or the number of frames per unit time may be determined to be decreased. On the contrary, in a case in which the size of the first partial image is less than a second threshold, the bitrate or the number of frames per unit time may be determined to be increased.

In another embodiment, the size, the position, the bitrate, or the number of frames per unit time of the first partial image may be determined based on the rotational speed information. This is described in more detail below with reference to FIGS. 10A, 10B, 11 and 12.

The other operations are described above with reference to FIG. 3, and thus, detailed descriptions thereof are omitted.

Figure 10A:
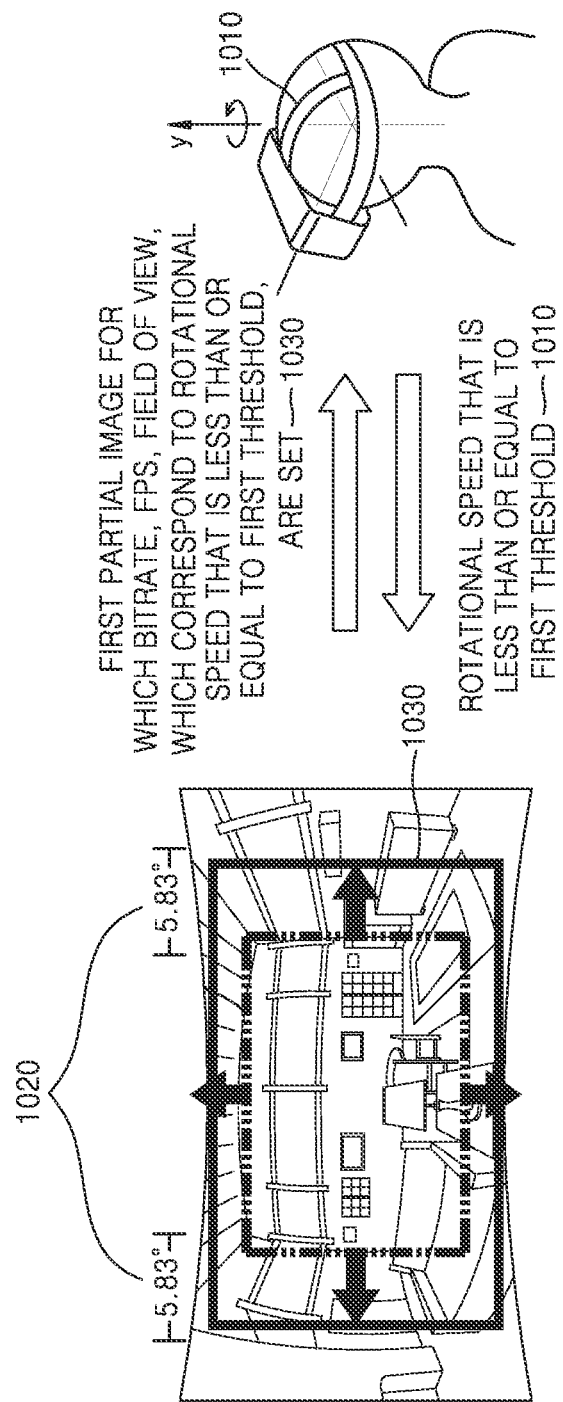
FIG. 10A is a diagram for describing a process, performed by the edge data network, of streaming a first partial image in a case in which the rotational speed of an electronic device 1000 worn by a user is less than or equal to a first threshold, according to an embodiment.

FIG. 10A is a diagram for describing a process, performed by the edge data network 2000, of streaming a first partial image in a case in which the rotational speed of an electronic device 1000 worn by a user is less than or equal to a first threshold, according to an embodiment. Referring to FIG. 10A, the electronic device 1000 may transmit rotational speed information to the edge data network 2000, and the edge data network 2000 may receive the rotational speed information and identify a rotational speed. For example, the electronic device 1000 may identify whether the rotational speed of the electronic device 1010 worn on the user's head is less than the first threshold (i.e., whether the rotational speed is low or the rotation is stopped).

In a case in which the current rotational speed is less than or equal to the first threshold (or immediately after establishing a connection), the edge data network 2000 may set a bitrate and an extra FoV 1020, which correspond to the rotational speed that is equal to or less than the first threshold (or as a default).

The edge data network 2000 may encode a first partial image 1030 for which the bitrate and the extra FoV 1020, which correspond to the rotational speed that is less than or equal to the first threshold, are set, and transmit, to the electronic device 1010, the encoded first partial image 1030.

Figure 10B:
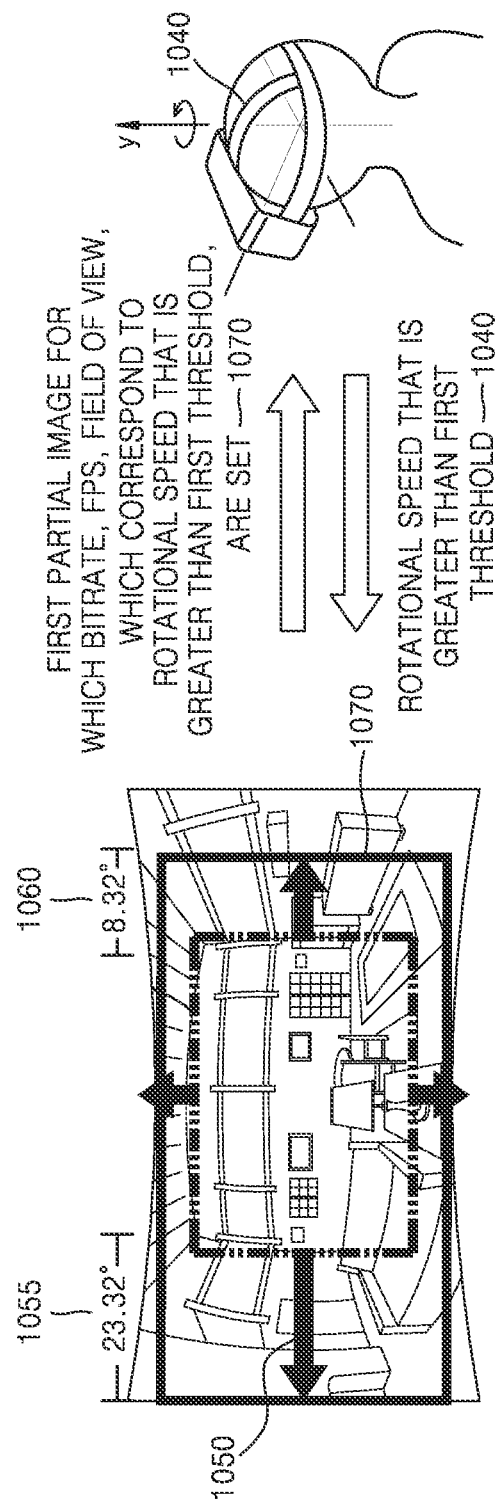
FIG. 10B is a diagram for describing a process, performed by the edge data network, of streaming a first partial image in a case in which the rotational speed of an electronic device 1040 worn on a user's head is greater than a first threshold, according to an embodiment.

FIG. 10B is a diagram for describing a process, performed by the edge data network 2000, of streaming a first partial image in a case in which the rotational speed of an electronic device 1040 worn on a user's head is greater than a first threshold, according to an embodiment. Referring to FIG. 10B, the electronic device 1040 may transmit rotational speed information to the edge data network 2000, and the edge data network 2000 may receive the rotational speed information and identify a rotational speed. In this case, the electronic device 1040 may identify whether the rotational speed of the electronic device 1040 worn on the user's head is greater than the first threshold (i.e., whether the rotational speed is high).

In a case in which the current rotational speed is greater than the first threshold, the edge data network 2000 may set a bitrate and sizes of extra FoVs 1055 and 1060, which correspond to the rotational speed that is greater than the first threshold. In this case, considering a rotational direction 1050, the extra FoV 1055 in the rotational direction 1050 may be set wider than the extra FoV 1060 in the opposite direction to the rotational direction 1050. The size of the extra FoV 1060 in the opposite direction may be equal to the size of a default extra FoV, but is not limited thereto, and may be larger than the size of a default extra FoV.

The edge data network 2000 may encode a first partial image 1070 with a bitrate that is less than the bitrate described above with reference to FIG. 10A, and the extra FoVs 1055 and 1060 that are wider in the rotational direction (and the opposite direction thereto) than the extra FoV described above with reference to FIG. 10A, and transmit the encoded first partial image 1070 to the electronic device 1000.

Figure 11:
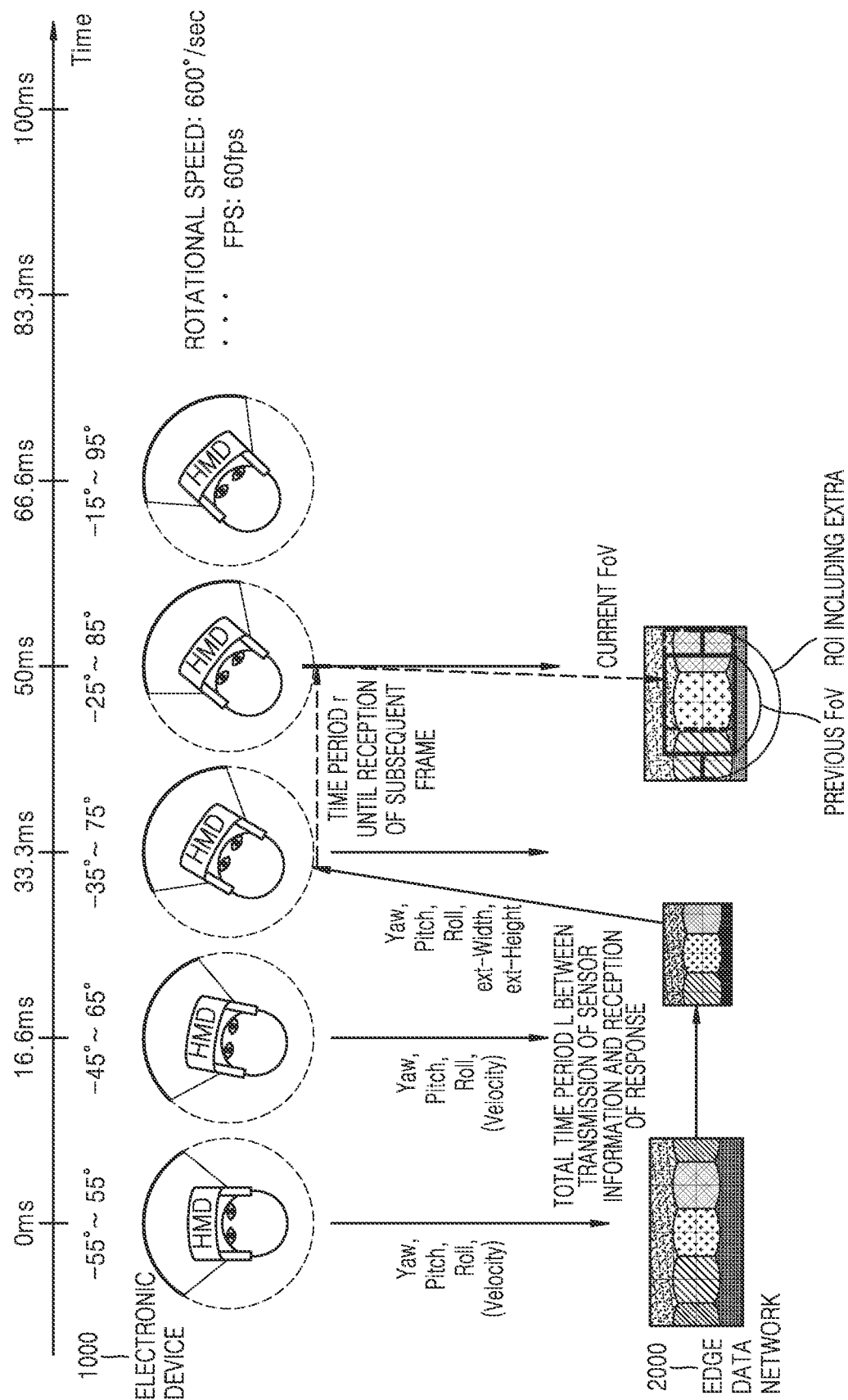
FIG. 11 is a diagram for describing a process, performed by the edge data network, of identifying left and right FoVs of an encoding-generated frame in a case in which a rotational speed is equal to a first value (i.e., the rotational speed is high), according to an embodiment.

FIG. 11 is a diagram for describing a process, performed by the edge data network 2000, of identifying left and right FoVs of an encoding-generated frame in a case in which a rotational speed is equal to a first value (i.e., the rotational speed is high), according to an embodiment. Referring to FIG. 11, the electronic device 1000 may periodically transmit, to the edge data network 2000, sensor information including orientation information, such as a yaw, a pitch, or a roll and instantaneous rotational speed information, such as a velocity. For example, the electronic device 1000 may transmit sensor information including orientation information and rotational speed information every 16.6 ms.

In this case, a total processing time period between a time point at which the electronic device 1000 transmits the sensor information and a time point at which the electronic device 1000 receives a response (a response including an extended height ext-Height, an extended width ext-Width, and reference orientation information Yaw, Pitch, and Roll) may be defined as a latency L. The latency L is a time period considering a time period required for processing by the edge data network 2000, and a network latency, and may be, for example, 33.3 ms.

A time period until the electronic device 1000 receives a subsequent frame may be defined as a frame interval r. For example, in a case in which the FPS is 60 fps, the frame interval r may be 16.6 ms.

A default FoV of the electronic device 1000 may be defined as F. For example, the default FoV F of the electronic device 1000 may be 110°. The rotational speed of the head may be defined as V. For example, the rotational speed V may be 600 degrees/sec. In this case, the edge data network 2000 may identify, according to the following equation, a left and right FoV region of interest (ROI) (default FoV+extra FoV) of a frame to be transmitted.

$$ROI = F + (2 \times (V \times (L+r)))$$ [Equation]

For example, when F is 110°, V is 600 degrees/sec, L is 33.3 ms, and r is 16.6 ms, the ROI may be identified as 170°.

Figure 12:
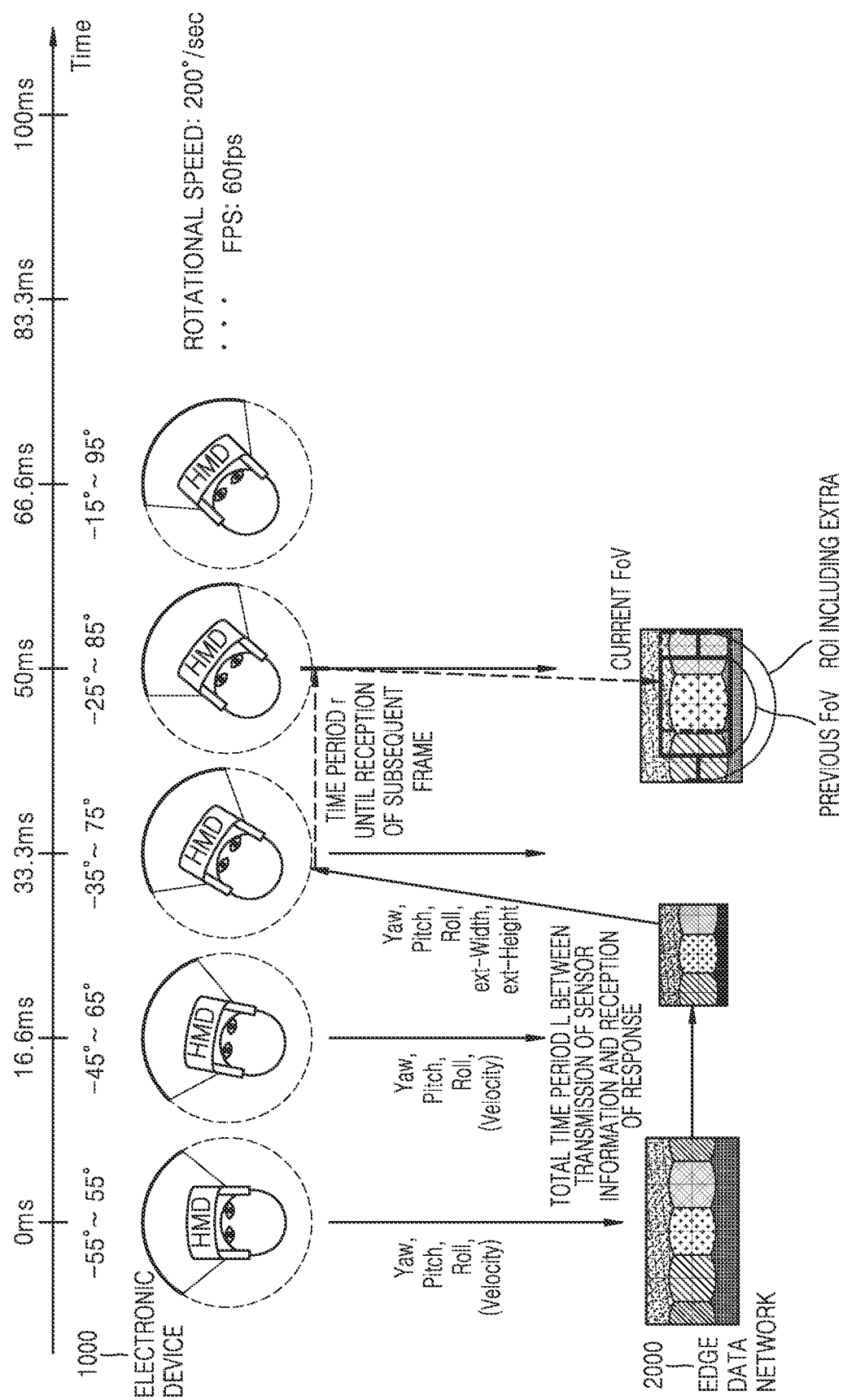
FIG. 12 is a diagram for describing a process, performed by the edge data network, of identifying left and right FoVs in a case in which a rotational speed is equal to a second value (i.e., the rotational speed is low), according to an embodiment.

FIG. 12 is a diagram for describing a process, performed by the edge data network 2000, of identifying left and right FoVs in a case in which a rotational speed is equal to a second value (i.e., the rotational speed is low), according to an embodiment. Referring to FIG. 12, unlike FIG. 11, the rotational speed may be changed from 600 degrees/sec to 200 degrees/sec. In this case, the edge data network 2000 may identify, according to the above equation, a left and right FoV ROI of a frame to be transmitted, and when other conditions are the same, the ROI may be identified as 130°.

Figure 13:
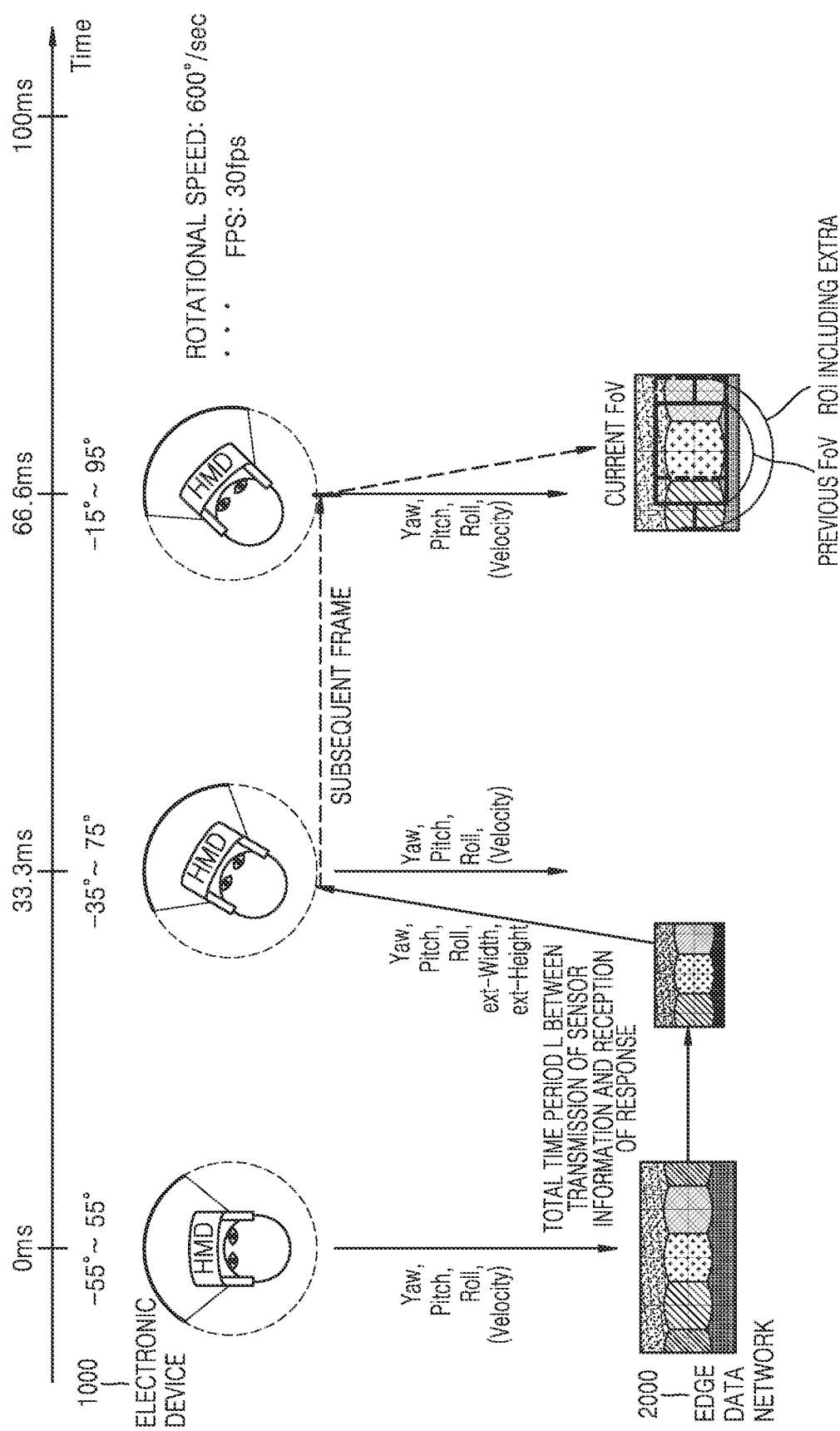
FIG. 13 is a diagram for describing a process, performed by the edge data network, of setting frames per second (FPS) to a low value and then identifying left and right FoVs in a case in which a rotational speed is equal to a first value (i.e., the rotational speed is high), according to an embodiment.

FIG. 13 is a diagram for describing a process, performed by the edge data network 2000, of setting FPS to a low value and then identifying left and right FoVs in a case in which a rotational speed is equal to a first value (i.e., the rotational speed is high), according to an embodiment. Referring to FIG. 13, unlike FIG. 11, the FPS set by the edge data network 2000 may be changed to 30 fps.

In this case, the edge data network 2000 may identify, according to the above equation, a left and right FoV ROI of a frame to be transmitted, and when other conditions are the same, the ROI may be identified as 170°.

Accordingly, the edge data network 2000 may identify a number of frames per unit time according to the rotational speed, identify an extra FoV according to the number of frames per unit time, and identify a FoV including a default FoV (a user FoV) and the extra FoV. In this case, as the number of frames per unit time decreases, the extra FoV identified considering an expected head movement during a frame interval may increase.

The process of identifying an FoV is described above with reference to FIGS. 11 to 13 on the assumption that the left and right extra FoVs are equal to each other, but the present disclosure is not limited thereto, and it may be understood by those of skill in the art that an FoV in a rotational direction and an FoV in the opposite direction may be identified to be asymmetric with each other. For example, an extra FoV in a rotational direction may be identified as V×(L+r), and an extra FoV in a direction opposite to the rotational direction may be identified as a default extra FoV. It may be understood by those of skill in the art that, alternatively, the edge data network 2000 may identify an extra FoV by considering a weight between the rotational direction and the opposite direction in addition to the rotational speed of the head, a latency, and a frame interval.

Hereinafter, a process is described with reference to FIGS. 11 and 13, in which the edge data network 2000 streams a frame and the electronic device 1000 renders the frame, based on the above-described method of identifying left and right FoVs, according to an embodiment.

The edge data network 2000 may identify in advance a certain range of a rotational speed in the horizontal direction. For example, the edge data network 2000 may identify in advance a range from 0 to 50 degrees/sec as Range 1, a range from 50 degrees/sec to 200 degrees/sec as Range 2, and a range from 200 degrees/sec to 600 degrees/sec as Range 3.

The electronic device 1000 and the edge data network 2000 may exchange dummy data with each other to measure a latency including a network latency. For example, the electronic device 1000 may transmit, to the edge data network 2000, a request fora default FoV image including orientation information (e.g., a yaw, a pitch, and a roll) and a timestamp indicating a time point of the orientation information (i.e., a measurement timestamp), receive the default FoV image from the edge data network 2000, calculate a difference between a timestamp (a current timestamp) indicating a time point of the reception of the default FoV image and the measurement timestamp, and measure a latency based on the difference between the timestamps.

The edge data network 2000 may identify in advance a FoV for the maximum speed for each range considering the latency and the like. In this case, the respective ranges and the FoVs corresponding thereto may be stored in a LUT.

The electronic device 1000 may periodically transmit, to the edge data network 2000, an angle at which the head is currently facing (e.g., a yaw, a pitch, and a roll) and their instantaneous rotational speeds (e.g., a velocity of the yaw, a velocity of the pitch, and a velocity of the roll). For example, information to be transmitted may be {"Yaw": 0.125, "Pitch": 0.545, "Roll": 0.13, "vYaw"=45 degrees/sec, "vPictch": 20 degrees/sec, "vRoll": 5 degrees/second}.

The edge data network 2000 may perform encoding to generate a frame of a FoV corresponding to a previously identified range, and transmit the frame. In this case, a reference angle and the height and width of an extended FoV area of the encoding-generated frame to be transmitted may be included in the payload of the transport protocol header of the encoding-generated frame to be transmitted. For example, information included in the payload may be {"Yaw": 0.125, "Pitch": 0.545, "Roll": 0.13, "extWidth": 110px, "extHeight": 200px}.

The electronic device 1000 may check the payload of received data, identify the position, width, and height of the frame, decode the frame, and display a reconstructed frame on the display of the electronic device 1000 based on the decoded frame.

Figure 14:
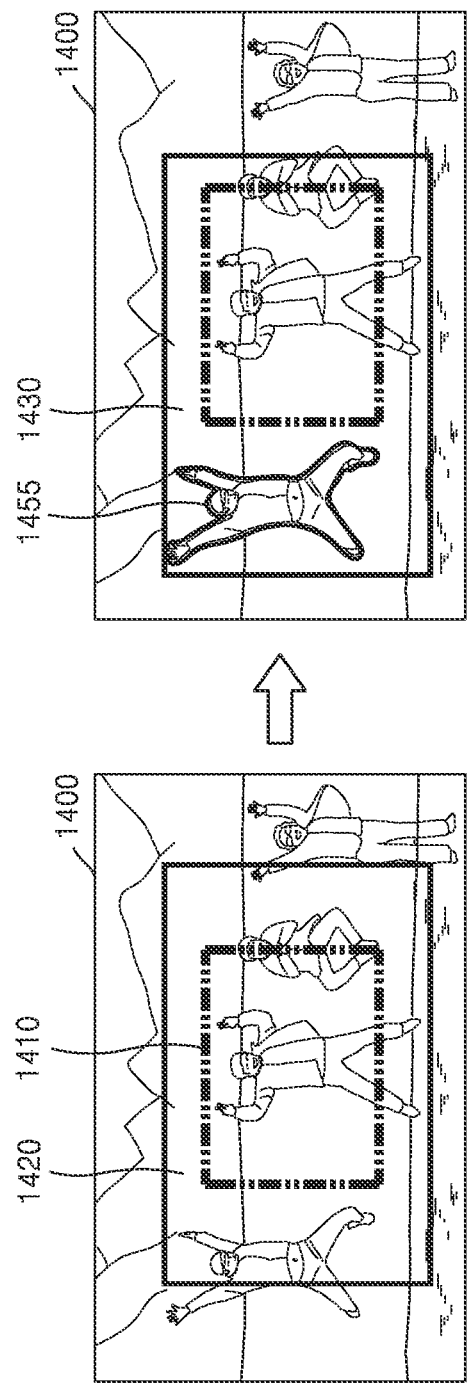
FIG. 14 is a diagram for describing a process, performed by the edge data network, of identifying an additional extra FoV area based on object detection, according to an embodiment.

FIG. 14 is a diagram for describing a process, performed by the edge data network 2000, of identifying an additional extra FoV area based on object detection, according to an embodiment. Referring to FIG. 14, as described above, the edge data network 2000 may identify a default FoV area 1410 and an extra FoV area 1420 in a VR image 1400. In this case, the edge data network 2000 may perform object detection, and detect an object 1455 that is not covered by the extra FoV area 1420. In this case, an extra FoV area 1430 that is wider than the extra FoV area 1420 may be identified so as to cover the detected object.

That is, because, in a case in which an object of interest is on the boundary of a FoV area and thus is not covered by the FoV area, a user may additionally move his or her head out of the FoV area to identify the object, a wider extra FoV area may be identified based on the detected object.

Figure 15:
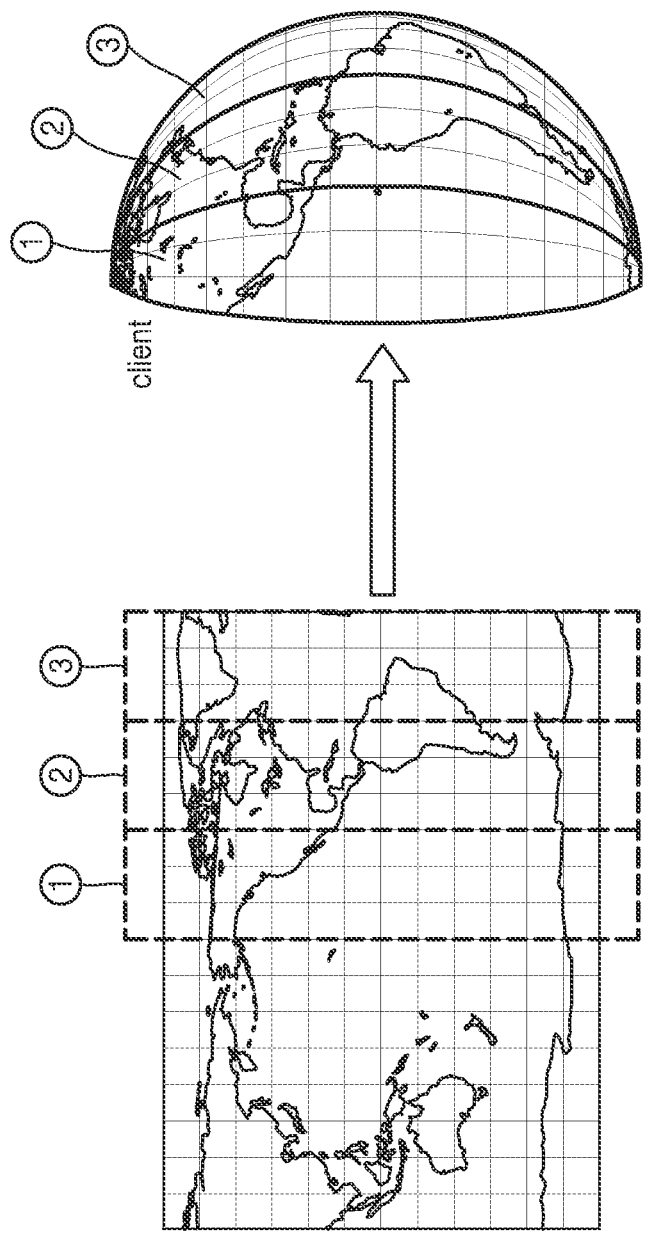
FIG. 15 is a diagram illustrating a process, performed by the edge data network, of transmitting, to the electronic device 1000, a first partial image in several data units, according to an embodiment.

FIG. 15 is a diagram illustrating a process, performed by the edge data network 2000, of transmitting, to the electronic device 1000, a first partial image in several data units, according to an embodiment.

The edge data network 2000 may divide a VR image 1500 in the vertical direction (e.g., the longitude) to obtain several data units, select one or more data units ①, ②, and ③ as much as required FoVs, from among the several data units in a process of obtaining the first partial image, encode the selected one or more data units, and transmit, to the electronic device 1000, the encoded data units.

Figure 16:
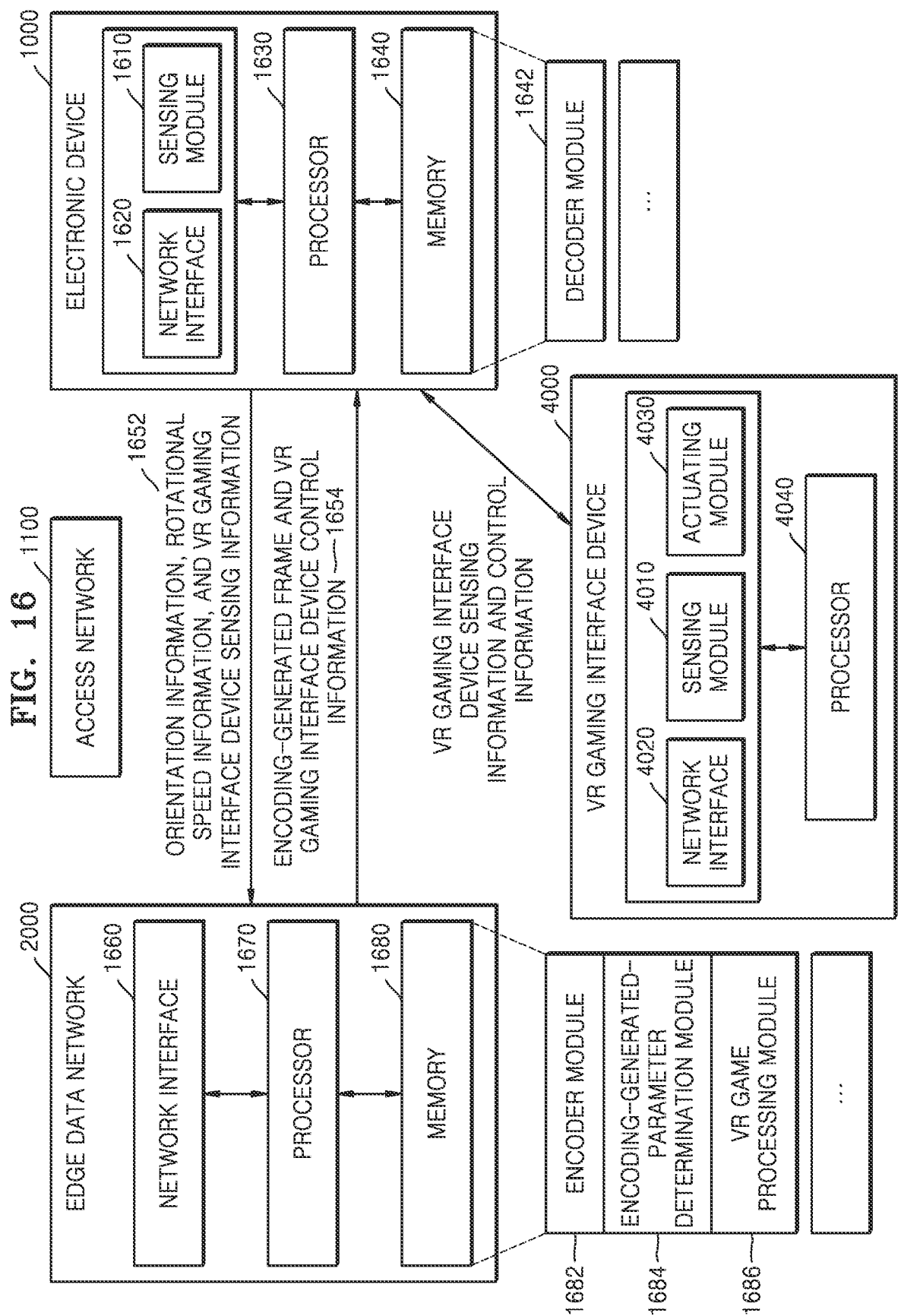
FIG. 16 is a diagram schematically illustrating an operation procedure between an electronic device, an edge data network, and a virtual reality (VR) gaming interface device.

FIG. 16 is a diagram schematically illustrating an operation procedure between an electronic device, an edge data network, and a VR gaming interface device. FIG. 16 further illustrates a VR gaming interface device 4000 in addition to the components of FIG. 4. In the VR gaming field, unlike the VR streaming field, user interaction is involved, and accordingly, the VR gaming interface device 4000 may be used in addition to the electronic device 1000.

The operation procedure between the electronic device and the edge data network in the VR streaming field is described above with reference to FIG. 4 and other drawings, and thus redundant descriptions are omitted, and the operation procedure between the electronic device, the edge data network, and the VR gaming interface device in the VR gaming field is hereinafter described.

The edge data network 2000 may generate a VR game image (an interactive VR image) included in a VR sequence based on instructions of a VR game processing module 1686.

In detail, the VR game processing module 1686 may store instructions for generating the first partial image of the VR game image based on orientation information, rotational speed information, and VR gaming interface device sensing information 1652. The VR game processing module 1686 may store instructions for outputting the VR gaming interface device control information 1654.

The electronic device 1000 may transmit the VR gaming interface device sensing information 1652 to the edge data network 2000 for VR game processing. In this case, the electronic device 1000 may receive the VR gaming interface device sensing information from the VR gaming interface device 4000.

The VR gaming interface device 4000 may include a network interface 4020, a sensing module 4010, and an actuating module 4030. The network interface 4020 may be a module for communicating with the outside, and the sensing module 4010 may be a module for detecting a motion of a user. The sensing module 4010 may obtain the VR gaming interface device sensing information.

The actuating module 4030 may be a module that provides the user with various types of outputs (e.g., haptic feedback), such as a vibration. The actuating module 4030 may provide the user with various types of outputs to the user based on VR gaming interface device sensing control information.

The VR gaming interface device 4000 may transmit the VR gaming interface device sensing information to the electronic device 1000. In addition, the VR gaming interface device 4000 may receive the VR gaming interface device control information from the electronic device 1000.

It is described above that the VR interface device sensing information may be transmitted to the edge data network 2000 via the electronic device 1000, and the VR interface device sensing information and the VR gaming interface device control information may be transmitted to the VR gaming interface device 4000 via the electronic device 1000, but the present disclosure is not limited thereto, and they may be directly exchanged between the VR gaming interface device 4000 and the edge data network 2000. In this case, synchronization information for synchronization with the electronic device 1000 may be also transmitted.

Although the operation procedure between the electronic device, the edge data network, and the VR gaming interface device in the VR gaming field is described above with respect to FIG. 16, the present disclosure is not limited thereto, and it will be understood by those of skill in the art that interactive VR may be mainly utilized in many fields in which a user may directly intervene in content and perform activities, e.g., simulation, training, or the like.

Figure 17:
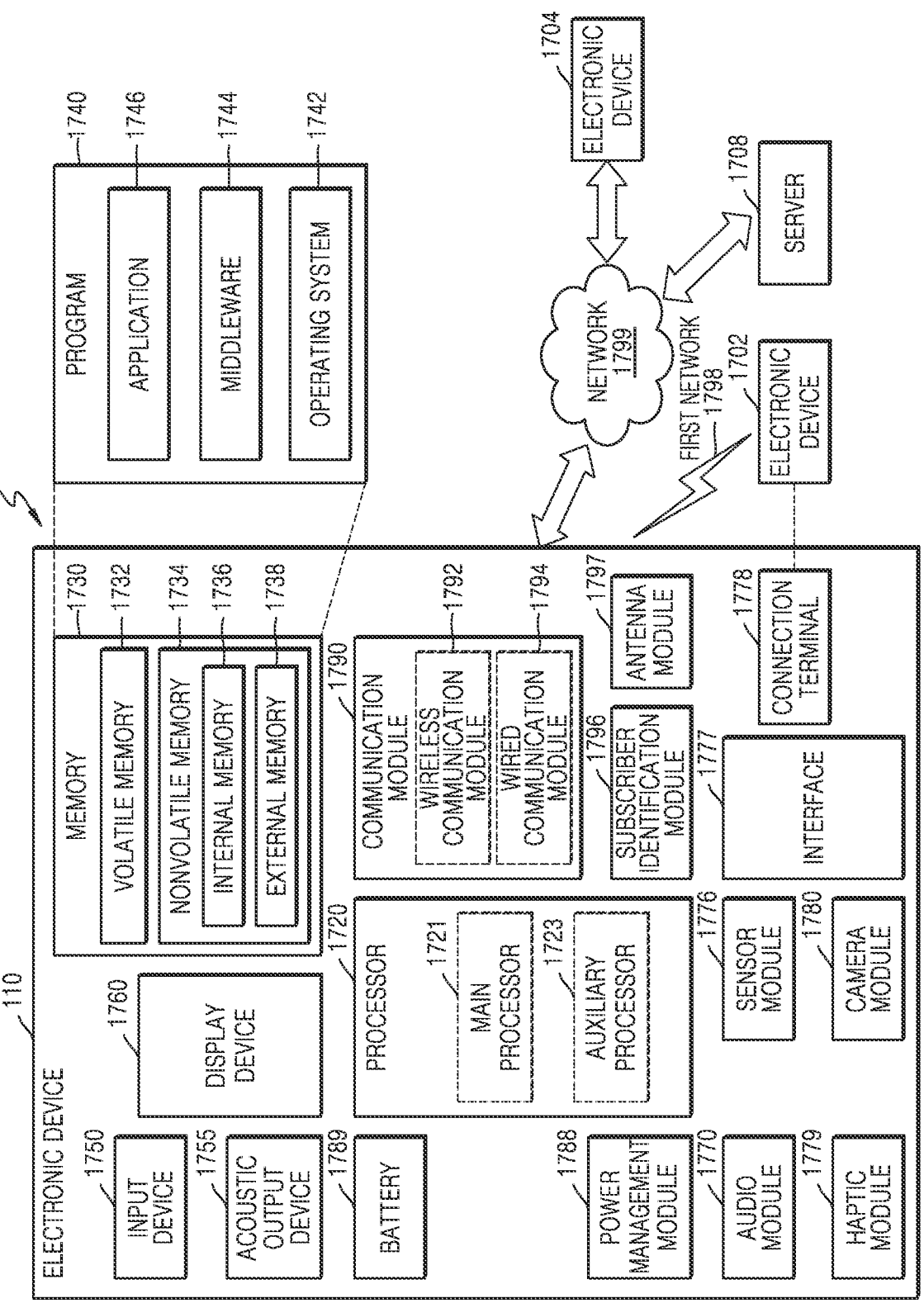
FIG. 17 is a block diagram of an electronic device according to an embodiment of the present disclosure.

FIG. 17 is a block diagram of an electronic device according to an embodiment of the present disclosure. The electronic device connected to the edge data network of FIGS. 1 to 16 may correspond to an electronic device 110 of FIG. 17.

For example, in the network environment 100, an electronic device 110 may communicate with an electronic device 1702 (here, the electronic device includes the VR gaming interface device) via a first network 1798 (e.g., a short-range wireless communication network), or may communicate with an electronic device 1704 or a server 1708 via a second network 1799 (e.g., a long-range wireless communication network).

According to an embodiment, the electronic device 110 may communicate with the electronic device 1704 via the server 1708. According to an embodiment, the electronic device 110 may include a processor 1720, a memory 1730, an input device 1750, an acoustic output device 1755, a display device 1760, an audio module 1770, a sensor module 1776, an interface 1777, a haptic module 1779, a camera module 1780, a power management module 1788, a battery 1789, a communication module 1790, a subscriber identification module 1796, or an antenna module 1797. In some embodiments, in the electronic device 110, at least one (e.g., the display device 1760 or the camera module 1780) of the components may be omitted, or one or more other components may be further included. In some embodiments, some of the components may be implemented as an integrated circuit. For example, the sensor module 1776 (e.g., a fingerprint sensor, an iris sensor, or an illuminance sensor) may be implemented by being embedded in the display device 1760 (e.g., a display).

The processor 1720 may execute, for example, software (e.g., a program 1740) to control at least one other component (e.g., a hardware or software component) of the electronic device 110, which is connected to the processor 1720, and perform various types of data processing or computation. According to an embodiment, as at least a portion of the data processing or computation, the processor 1720 may load, in a volatile memory 1732, a command or data received from another component (e.g., the sensor module 1776 or the communication module 1790), process the command or data stored in the volatile memory 1732, and store result data in a nonvolatile memory 1734.

According to an embodiment, the processor 1720 may execute an application client, and according to the execution of the application client, the processor 1720 may transmit, to the edge data network 2000, a request message for checking a network protocol to be used by the application client. In addition, the processor 1720 may receive, from the edge data network 2000, a response message indicating the network protocol to be used by the application client. The processor 1720 may update a network protocol to be used by a UE application, based on the response message. The processor 1720 may select a network socket corresponding to the updated network protocol. The processor 1720 may receive data generated for the application client, from the edge data network 2000 by using the selected network socket.

According to an embodiment, the processor 1720 may include a main processor 1721 (e.g., a CPU or an application processor (AP)) and an auxiliary processor 1723 (e.g., a graphics processing unit (GPU), an image signal processor (ISP), a sensor hub processor, or a communication processor (CP)) operable independently from or together with the main processor 1721. Additionally or substitutionally, the auxiliary processor 1723 may be configured to use lower power than the main processor 1721 or to be specialized to a designated function. The auxiliary processor 1723 may be implemented separately from or as a part of the main processor 1721.

The auxiliary processor 1723 may control at least some of functions or states related to at least one (e.g., the display device 1760, the sensor module 1776, or the communication module 1790) of the components in the electronic device 110 instead of the main processor 1721 while the main processor 1721 is in an inactive state (e.g., a sleep state) or together with the main processor 1721 while the main processor 1721 is in an active state (e.g., executing an application). According to an embodiment, the auxiliary processor 1723 (e.g., an ISP or a CP) may be implemented as a portion of another component (e.g., the camera module 1780 or the communication module 1790) functionally associated with the auxiliary processor 1723.

The memory 1730 may store various pieces of data to be used by at least one component (e.g., the processor 1720 or the sensor module 1776) in the electronic device 110. The data may include, for example, software (e.g., the program 1740) and input data or output data related to a command associated with the software. The memory 1730 may include the volatile memory 1732 and the nonvolatile memory 1734.

The program 1740 may be stored as software in the memory 1730 and may include, for example, an operating system (OS) 1742, middleware 1744, and an application 1746. In an embodiment, the program 1740 may include the first application client 122 and the second application client 124 of FIG. 1. In addition, the program 1740 may include the edge enabler client 130 of FIG. 1.

The input device 1750 may receive, from the outside of the electronic device 110, a command or data to be used for a component (e.g., the processor 1720) of the electronic device 110.

The acoustic output device 1755 may output an acoustic signal to the outside of the electronic device 110. The acoustic output device 1755 may include, for example, a speaker. The speaker may be used for general purposes, such as reproducing multimedia or record.

The display device 1760 may visually provide information to the outside (e.g., a user) of the electronic device 110. The display device 1760 may include, for example, a display, a hologram device, or a projector and a control circuitry configured to control a corresponding device. According to an embodiment, the display device 1760 may include a touch circuitry configured to detect a touch or a sensor circuitry (e.g., a pressure sensor) configured to measure a strength of a force generated by the touch.

The audio module 1770 may convert a sound into an electrical signal or vice versa. According to an embodiment, the audio module 1770 may obtain a sound through the input device 1750 or output a sound through the acoustic output device 1755 or an external electronic device (e.g., the electronic device 1702 (e.g., a speaker or headphones)) directly or wirelessly connected to the electronic device 110.

The sensor module 1776 may detect an operating state (e.g., power or a temperature) of the electronic device 110 or an external environment state (e.g., a user state) and generate an electrical signal or a data value corresponding to the detected state. According to an embodiment, the sensor module 1776 may include, for example, a gesture sensor, a gyro sensor, a barometer sensor, a magnetic sensor, an acceleration sensor, a grip sensor, a proximity sensor, a color sensor (e.g., an RGB (red-green-blue) sensor), an infrared (IR) sensor, a biometric sensor, a temperature sensor, a humidity sensor, an illuminance sensor, or sensors related to an autonomous vehicle (e.g., an inertia measurement unit (IMU), a global positioning system (GPS) sensor, a camera, a light imaging detection and ranging (LIDAR) sensor, and a radio detection and ranging (RADAR) sensor).

The interface 1777 may support one or more designated protocols usable to be directly or wirelessly connected to an external electronic device (e.g., the electronic device 1702) of the electronic device 110.

A connection terminal 1778 may include a connector through which the electronic device 110 is physically connectable to an external electronic device (e.g., the electronic device 1702).

The haptic module 1779 may convert an electrical signal into a mechanical stimulus (e.g., vibrations or a motion) or an electrical stimulus of which the user may be aware through a tactile or movement sensation.

The camera module 1780 may capture a still image or a moving image. According to an embodiment, the camera module 1780 may include one or more lenses, image sensors, ISPs, or flashes.

The power management module 1788 may manage power to be supplied to the electronic device 110.

The battery 1789 may supply power to at least one component in the electronic device 110.

The communication module 1790 may establish a direct (e.g., wired) communication channel or a wireless communication channel between the electronic device 110 and an external electronic device (e.g., the electronic device 1702, the electronic device 1704, or the server 1708) and support communication through the established communication channel. The communication module 1790 may include one or more communication processors operating independently from the processor 1720 (e.g., an AP) and supporting direct (e.g., wired) communication or wireless communication. According to an embodiment, the communication module 1790 may include a wireless communication module 1792 (e.g., a cellular communication module, a short-range communication module, or a global navigation satellite system (GNSS) communication module) and a wired communication module 1794 (e.g., a local area network (LAN) communication module or a power line communication module). A corresponding communication module among these communication modules may communicate with an external electronic device over the first network 1798 (e.g., a short-range communication network such as Bluetooth, Wi-Fi direct, or infrared data association (IrDA)) or the second network 1799 (e.g., a long-range communication network such as a cellular network, the Internet, or a computer network (e.g., a LAN or a wide area network (WAN)). These types of communication modules may be integrated into one component (e.g., a single chip) or implemented by a plurality of separate components (e.g., a plurality of chips).

The wireless communication module 1792 may verify or authenticate the electronic device 110 in a communication network such as the first network 1798 or the second network 1799 by using subscriber information (e.g., an international mobile subscriber identity (IMSI)) stored in the subscriber identification module 1796.

The antenna module 1797 may transmit a signal or power to the outside (e.g., an external electronic device) or receive a signal or power from the outside.

At least some of the components may be connected to each other in a peripheral device communication scheme (e.g., a bus, a general-purpose input and output (GPIO), a serial peripheral interface (SPI), or a mobile industry processor interface (MIPI)) and exchange a signal (e.g., a command or data) with each other.

According to an embodiment, a command or data may be transmitted or received between the electronic device 110 and the external electronic device 1704 via the server 1708 connected over the second network 1799. Each of the electronic devices 1702 and 1704 may be the same or different type as or from that of the electronic device 110.

According to an embodiment, all or some of operations executed by the electronic device 110 may be executed by one or more external devices among the electronic devices 1702 and 1704 and the server 1708. For example, when the electronic device 110 is supposed to perform a certain function or service automatically or in response to a request from a user or another device, the electronic device 110 may request one or more of the external electronic devices 1702 and 1704 to perform at least a portion of the function or service, additionally or instead of autonomously executing the function or the service. The one or more of the external electronic devices 1702 and 1704 having received the request may execute at least a portion of the requested function or service or an additional function or service related to the request and deliver a result of the execution to the electronic device 110. The electronic device 110 may process the result as it is or additionally and provide the processing result as at least a portion of a response to the request. To this end, for example, cloud computing, distributed computing, or client-server computing may be used.

What is claimed is:

1. A method, performed by a server, of transmitting image content to an electronic device connected to the server, the method comprising:
    obtaining, from the electronic device, sensor information comprising orientation information detected by the electronic device;
    obtaining state information regarding the server and the electronic device;
    identifying a size of a first partial image and a position of the first partial image, based on the sensor information and the state information, wherein the image content is stored in a storage of the server and the first partial image is a part of the image content;
    generating a first frame by encoding the first partial image, based on the identified size of the first partial image or identified position of the first partial image; and
    transmitting the generated first frame to the electronic device.

2. The method of claim 1, wherein the server is an edge data network.

3. The method of claim 1, wherein:
    the method further comprises, based on the sensor information and the state information, identifying a bitrate of the first partial image or a number of frames per unit time of the first partial image, and
    the generating of the first frame by encoding the first partial image comprises generating the first frame by encoding the first partial image based on at least one of the identified size of the first partial image, the identified position of the first partial image, the identified bitrate of the first partial image, or the identified number of frames per unit time of the first partial image.

4. The method of claim 3, wherein the identifying of at least one of the size of the first partial image, the position of the first partial image, the bitrate of the first partial image, or the number of frames per unit time of the first partial image based on the sensor information and the state information comprises at least one of:
    in a first case in which a value of at least one state parameter in the state information is less than or equal to at least one first threshold, identifying a first size of the first partial image and a first number of frames per unit time of the first partial image, which correspond to the at least one state parameter that is less than or equal to the first threshold,
    wherein the value of at least one state parameter is related to at least one of (i) at least one network state, (ii) a state of the server, or (iii) a state of the electronic device, which are included in the state information; or
    in a second case in which the value of at least one state parameter in the state information is greater than at least one second threshold, identifying a second size and a second number of frames per unit time of the first partial image, which correspond to the at least one state parameter that is greater than the second threshold,
    wherein the first size of the first partial image, which corresponds to the at least one state parameter that is less than or equal to the first threshold, is greater than the second size of the first partial image, which corresponds to the at least one state parameter that is greater than the second threshold, and
    the first number of frames per unit time of the first partial image, which corresponds to the at least one state parameter that is less than or equal to the first threshold, is less than the second number of frames per unit time of the first partial image, which corresponds to the at least one state parameter that is greater than the second threshold.

5. The method of claim 4, wherein the first partial image comprises a user field-of-view image corresponding to the orientation information and an extra field-of-view image corresponding to the number of frames per unit time.

6. The method of claim 5, wherein the first partial image comprises data units of a preset field-of-view range, and
    the generating of the first frame by encoding the first partial image comprises:
        encoding a first data unit of at least one preset field-of-view range corresponding to the user field-of-view image in the first partial image, and encoding a second data unit of at least one preset field-of-view range corresponding to the extra field-of-view image in the first partial image; and
        generating the first frame comprising the encoded first data unit and the encoded second data unit.

7. The method of claim 3, wherein the identifying of at least one of the size of the first partial image, the position of the first partial image, the bitrate of the first partial image, or the number of frames per unit time of the first partial image based on the sensor information and the state information comprises at least one of:
- in a first case in which a value of at least one state parameter in the state information is less than or equal to at least one first threshold, identifying a first size of the first partial image, a first number of frames per unit time of the first partial image, and a first bitrate of the first partial image, which correspond to the at least one state parameter that is less than or equal to the first threshold,
  wherein the value of at least one state parameter is related to at least one of at least one network state, a state of the server, or a state of the electronic device, which are included in the state information; or
- in a second case in which the value of at least one state parameter in the state information is greater than at least one second threshold, identifying a second size of the first partial image, a second number of frames per unit time of the first partial image, and a second bitrate of the first partial image, which correspond to the at least one state parameter that is greater than the second threshold, wherein:
the first size of the first partial image, which corresponds to the at least one state parameter that is less than or equal to the first threshold, is greater than the second size of the first partial image, which corresponds to the at least one state parameter that is greater than the second threshold,
the first number of frames per unit time of the first partial image, which corresponds to the at least one state parameter that is less than or equal to the first threshold, is less than the second number of frames per unit time of the first partial image, which corresponds to the at least one state parameter that is greater than the second threshold, and
the first bitrate of the first partial image, which corresponds to the at least one state parameter that is less than or equal to the first threshold, is less than the second bitrate of the partial image, which corresponds to the at least one state parameter that is greater than the second threshold.

8. The method of claim 3, wherein:
the sensor information further comprises rotational speed information,
the state information further comprises connected device state information,
the identifying of at least one of the size of the first partial image, the position of the first partial image, the bitrate of the first partial image, or the number of frames per unit time of the first partial image based on the sensor information and the state information comprises at least one of:
- in a first case in which a rotational speed of the rotational speed information in the sensor information is greater than a first threshold, identifying a first size of the first partial image, which corresponds to the rotational speed that is greater than the first threshold; or
- in a second case in which the rotational speed of the rotational speed information is less than or equal to a second threshold, identifying a second size of the first partial image, which corresponds to the rotational speed that is less than or equal to the second threshold, wherein the first size of the first partial image, which corresponds to the rotational speed that is greater than the first threshold, is greater than the second size of the first partial image, which corresponds to the rotational speed that is less than or equal to the second threshold.

9. The method of claim 8, wherein the first partial image comprises a user field-of-view image corresponding to the orientation information, and an extra field-of-view image corresponding to at least one of the rotational speed of the rotational speed information or a rotational direction of the rotational speed information.

10. The method of claim 9, wherein:
the extra field-of-view image comprises a first extra field-of-view image in a in the rotational direction with respect to the field-of-view image and a second extra field-of-view image in a direction opposite to the rotational direction, and
the first extra field-of-view image is larger than the second extra field-of-view image.

11. The method of claim 3, wherein the identifying of at least one of the size of the first partial image, the position of the first partial image, the bitrate of the first partial image, or the number of frames per unit time of the first partial image based on the sensor information and the state information comprises at least one of:
- in a first case in which a rotational speed of the rotational speed information is greater than a first threshold, identifying a first size of the first partial image and a first number of frames per unit time of the first partial image, which correspond to the rotational speed that is greater than the first threshold; or
- in a second case in which the rotational speed of the rotational speed information is less than or equal to a second threshold, identifying a second size of the first partial image and a second number of frames per unit time of the first partial image, which correspond to the rotational speed that is less than or equal to the second threshold, wherein:
the first size of the first partial image, which corresponds to the rotational speed that is greater than the first threshold, is greater than the second size of the first partial image, which corresponds to the rotational speed that is less than or equal to the second threshold, and
the first number of frames per unit time of the first partial image, which corresponds to the rotational speed that is greater than the first threshold, is less than the second number of frames per unit time of the first partial image, which corresponds to the rotational speed that is less than or equal to the second threshold.

12. The method of claim 11, wherein the first partial image comprises a user field-of-view image corresponding to the orientation information and an extra field-of-view image identified based on the number of frames per unit time and at least one of the rotational speed of the rotational speed information or a rotational direction of the rotational speed information.

13. The method of claim 3, wherein the identifying of at least one of the size of the first partial image, the position of the first partial image, the bitrate of the first partial image, or the number of frames per unit time of the first partial image based on the sensor information and the state information comprises at least one of:

identifying a first size of the first partial image, a first number of frames per unit time of the first partial image, and a first bitrate of the first partial image, which correspond to a rotational speed that is greater than a first threshold; or identifying a second size of the first partial image, a second number of frames per unit time of the first partial image, and a second bitrate of the first partial image, which correspond to the rotational speed that is less than or equal to a second threshold, wherein:

a first size of the first partial image, which corresponds to the rotational speed that is greater than the first threshold, is greater than the second size of the first partial image, which corresponds to the rotational speed that is less than or equal to the second threshold, the first number of frames per unit time of the first partial image, which corresponds to the rotational speed that is greater than the first threshold, is less than the second number of frames per unit time of the first partial image, which corresponds to the rotational speed that is less than or equal to the second threshold, and the first bitrate of the first partial image, which corresponds to the rotational speed that is greater than the first threshold, is less than the second bitrate of the first partial image, which corresponds to the rotational speed that is less than or equal to the second threshold.

14. A non-transitory computer-readable recording medium having recorded thereon a program for executing the method of claim 3.

15. The method of claim 1, wherein the first partial image is a partial image in a first virtual reality (VR) image having a particular frame index of a VR sequence comprising a plurality of frames, and the first partial image is related to the orientation information indicating the position of the first partial image.

16. A non-transitory computer-readable recording medium having recorded thereon a program for executing the method of claim 1.

17. A server for transmitting image content to an electronic device connected to the server, the server comprising:
a network interface;
a memory storing one or more instructions; and
a processor configured to execute the one or more instructions to:
obtain, from the electronic device, sensor information comprising orientation information detected by the electronic device,
obtain state information between the server and the electronic device,
identify a size of a first partial image and a position of the first partial image, based on the sensor information and the state information, wherein the image content is stored in a storage of the server and the first partial image is a part of the image content,
generate a first frame by encoding the first partial image based on the identified size of the first partial image or the identified position of the first partial image, and
transmit the generated first frame to the electronic device.

18. The server of claim 17, wherein the server is an edge data network.

19. A method, performed by an electronic device, of streaming image content obtained from a server, the method comprising:
transmitting, to the server, orientation information and rotational speed information, a state parameter, and connected device state information;
obtaining, from the server, a first frame generated by encoding a first partial image according to at least one of a size of the partial image, a position of the partial image, a bitrate of the partial image, and a number of frames per unit time of the first partial image, which are identified based on at least one of the orientation information, the rotational speed information, the state parameter, or the connected device information;
reconstructing the first partial image by decoding the first frame; and
reproducing the reconstructed first partial image based on the orientation information at a time point of the reconstructing.

20. The method of claim 19, wherein:
the orientation information is an angle value of a gaze of a user using the electronic device,
the rotational speed information is information on a rotational speed of the user using the electronic device,
the state parameter is one or more of (i) an amount of data per unit time processed by the electronic device, (ii) a total sum of data received per unit time by the electronic device, (iii) a number of packets received per unit time by the electronic device, and
the connected device information indicates a size of a viewport area of the electronic device.

* * * * *